United States Patent
Kamo

(10) Patent No.: US 12,010,403 B2
(45) Date of Patent: Jun. 11, 2024

(54) INFORMATION PROCESSING APPARATUS, INFORMATION PROCESSING METHOD, AND PROGRAM

(71) Applicant: SONY GROUP CORPORATION, Tokyo (JP)

(72) Inventor: Manabu Kamo, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 39 days.

(21) Appl. No.: 17/778,678

(22) PCT Filed: Nov. 13, 2020

(86) PCT No.: PCT/JP2020/042413
§ 371 (c)(1),
(2) Date: May 20, 2022

(87) PCT Pub. No.: WO2021/124750
PCT Pub. Date: Jun. 24, 2021

(65) Prior Publication Data
US 2022/0417618 A1    Dec. 29, 2022

(30) Foreign Application Priority Data

Dec. 20, 2019  (JP) ................................ 2019-230431

(51) Int. Cl.
*H04N 21/854*    (2011.01)
*G06T 5/50*    (2006.01)
(Continued)

(52) U.S. Cl.
CPC ............. *H04N 21/854* (2013.01); *G06T 5/50* (2013.01); *G06V 10/44* (2022.01); *G06V 10/761* (2022.01);
(Continued)

(58) Field of Classification Search
CPC ............... H04N 21/854; H04N 21/234; H04N 21/25875; G06V 10/761; G06V 10/44; G06T 5/50
See application file for complete search history.

(56) References Cited

U.S. PATENT DOCUMENTS 5,501,463 A * 3/1996 Gobush ................... G01S 17/89
473/200
5,697,791 A * 12/1997 Nashner ................. A63B 69/00
434/254
(Continued)

FOREIGN PATENT DOCUMENTS

CN    101834999 A    9/2010
JP    2003-18583 A    1/2003
(Continued)

OTHER PUBLICATIONS

International Search Report dated Feb. 2, 2021 in PCT/JP2020/042413 filed on Nov. 13, 2020, 2 pages.

*Primary Examiner* — Nicholas T Corbo
(74) *Attorney, Agent, or Firm* — Oblon, McClelland, Maier & Neustadt, L.L.P.

(57) ABSTRACT

For example, in a competition, such as a race competition, in which comparison with others is important, there is a demand for viewing a relationship between a motion of the entire competition and a motion of each player at once. For this purpose, an information processing apparatus includes: a content generation unit that generates display content by combining a first image captured by a first imaging device and a second image captured by the first imaging device or another imaging device and having a part of subjects in the first image as a subject.

12 Claims, 13 Drawing Sheets

(51) Int. Cl.
  *G06V 10/44* (2022.01)
  *G06V 10/74* (2022.01)
  *H04N 21/234* (2011.01)
  *H04N 21/258* (2011.01)

(52) U.S. Cl.
  CPC ..... *H04N 21/234* (2013.01); *H04N 21/25875* (2013.01); *G06T 2207/20221* (2013.01)

(56) References Cited

U.S. PATENT DOCUMENTS

| | | | | |
|---|---|---|---|---|
| 10,531,137 | B1* | 1/2020 | Matak | A63B 24/0062 |
| 2002/0064764 | A1* | 5/2002 | Fishman | A63B 69/3629 |
| | | | | 434/252 |
| 2004/0070691 | A1* | 4/2004 | Kojima | H04N 5/272 |
| | | | | 348/157 |
| 2004/0218099 | A1* | 11/2004 | Washington | H04N 21/234381 |
| | | | | 348/571 |
| 2012/0120771 | A1* | 5/2012 | Lapides | A63B 71/0686 |
| | | | | 368/10 |
| 2014/0141877 | A1* | 5/2014 | Jensen | H04N 21/4316 |
| | | | | 463/30 |
| 2015/0139502 | A1* | 5/2015 | Holohan | G06T 7/251 |
| | | | | 382/107 |
| 2015/0382076 | A1* | 12/2015 | Davisson | H04N 21/435 |
| | | | | 725/62 |
| 2017/0124769 | A1* | 5/2017 | Saito | H04N 23/698 |
| 2017/0238055 | A1* | 8/2017 | Chang | H04N 21/4662 |
| | | | | 725/19 |
| 2018/0262708 | A1 | 9/2018 | Lee | |
| 2019/0261027 | A1 | 8/2019 | Edward | |

FOREIGN PATENT DOCUMENTS

| | | |
|---|---|---|
| JP | 2003179908 A | 6/2003 |
| JP | 2014-236426 A | 12/2014 |
| JP | 2017-151519 A | 8/2017 |
| JP | 2019013057 A | 1/2019 |

* cited by examiner

INFORMATION PROCESSING APPARATUS, INFORMATION PROCESSING METHOD, AND PROGRAM

TECHNICAL FIELD

The present technology relates to an information processing apparatus, an information processing method, and a program, and particularly relates to a technology of generating content in which two images are combined.

BACKGROUND ART

For example, in the case of watching a sport competition or the like, it is difficult to visually recognize performances for a plurality of subjects at the same time. On the other hand, Patent Document 1 discloses that stream data captured by a plurality of television cameras is combined to generate one piece of combined stream data, and the combined stream data is distributed via a network in response to a request from a viewer terminal.

CITATION LIST

Patent Document

Patent Document 1: Japanese Patent Application Laid-Open No. 2003-18583

SUMMARY OF THE INVENTION

Problems to be Solved by the Invention

However, for example, in a competition, such as a race competition, in which comparison with others is important, there is a demand for viewing a relationship between a motion of the entire competition and a motion of each player at once.

Therefore, an object of the present technology is to generate appropriate content for grasping a motion of a subject in the whole.

Solutions to Problems

An information processing apparatus according to the present technology includes: a content generation unit that generates display content by combining a first image captured by a first imaging device and a second image captured by the first imaging device or another imaging device and having a part of subjects in the first image as a subject.

In the case of imaging a plurality of subjects, there is a demand for simultaneously recording an image for every subject or an image with a changed angle of view, or a demand for browsing.

The information processing apparatus described above may include a synchronization processing unit that performs a synchronization process of synchronizing the first image and the second image.

Therefore, it is possible to transmit, to the user terminal or the like, the display content obtained by combining the first image and the second image.

The information processing apparatus described above may include a synchronization processing unit that synchronizes the first image and the second image.

Therefore, even when the first image and the second image are captured at different angles of view, it is possible to grasp a temporal relationship.

In the information processing apparatus described above, the display content may include superimposition information.

The superimposition information is, for example, character (text) information, image information, or the like.

In the information processing apparatus described above, the superimposition information may be explanatory information on the first image or the second image.

For example, in the case of a race image, the explanatory information is explanatory information which helps understanding in browsing the image, such as a holding date and time, a holding place, a race name, and a name of a participant.

In the information processing apparatus described above, the superimposition information may be comparison information for the subject of the second image.

The comparison information is, for example, information indicating a difference from the target record of the player who is the subject of the second image. Specifically, the comparison information is information indicating how far ahead or behind the target record the subject is.

In the information processing apparatus described above, the comparison information may be information indicating a result of the subject of the second image.

The result of the subject of the second image is, for example, past record of the player oneself of the subject of the second image.

In the information processing apparatus described above, the comparison information may be information indicating a result of a person other than the subject of the second image.

The result of the person other than the subject of the second image is, for example, a record of a player with the best result among other players participating in the same race. Alternatively, the result may be a result or the like such as a Japanese record or a world record.

The information processing apparatus described above may include an analysis processing unit that performs image analysis on the subject of the second image and extracts a characteristic amount which affects a result of the subject of the second image. The superimposition information may be information regarding the characteristic amount.

For example, in the case of swimming, the characteristic amount that affects the result of the subject of the second image is the number of times or the frequency of breathing, the number of times of hand scratching, or the like.

The information processing apparatus described above may include an authentication processing unit that performs user authentication on the basis of received user information. The transmission processing unit may select and transmit the display content on the basis of an authentication result.

The display content is image content including personal information. Such content is transmitted only in a case where the user authentication is successful.

The information processing apparatus described above may include a content management unit that sets a disclosure range for every display content.

The display content may or may not have a browsing restriction depending on the player of the subject.

The information processing apparatus described above may include an authentication processing unit that performs user authentication on the basis of received user information. The transmission processing unit may transmit the display content on the basis of an authentication result and the disclosure range.

For example, the user is specified by the user authentication, and it is determined whether or not to accept the request of the user on the basis of the disclosure range set in the display content.

In the information processing apparatus described above, in the synchronization process, image comparison between the first image and the second image may be performed.

For example, in a case where the first image and the second image are moving images, the synchronization process is performed by partially comparing both images with each other to calculate a matching degree.

In the information processing apparatus described above, the transmission processing unit may perform streaming distribution.

For example, the streaming distribution is performed by combining an official first image obtained by capturing an entire image in a bird's eye view in a competition and an official second image focusing on a specific player.

An information processing method of the present technology is executed by an information processing apparatus. The method includes: generating display content by combining a first image captured by a first imaging device and a second image captured by the first imaging device or another imaging device and having a part of subjects in the first image as a subject.

A program of the present technology causes an information processing apparatus to execute: a generation process of generating display content by combining a first image captured by a first imaging device and a second image captured by the first imaging device or another imaging device and having a part of subjects in the first image as a subject.

Therefore, it is possible to generate appropriate content for grasping the motion of the subject in the whole.

MODE FOR CARRYING OUT THE INVENTION

Hereinafter, an embodiment will be described in the following order.
<1. System configuration>
<2. Configuration of distribution server device>
<3. Editing example of captured image data>
<4. Processing example in distribution server device>
<4-1. Distribution content generation process>
<4-2. Coaching information extraction process>
<4-3. Request responding process>
<5. Live distribution>
<6. Modification>
<6-1. First modification of editing example of captured image data>
<6-2. Second modification of editing example of captured image data>
<7. Summary>
<8. Present technology>

1. System Configuration

Figure 1:
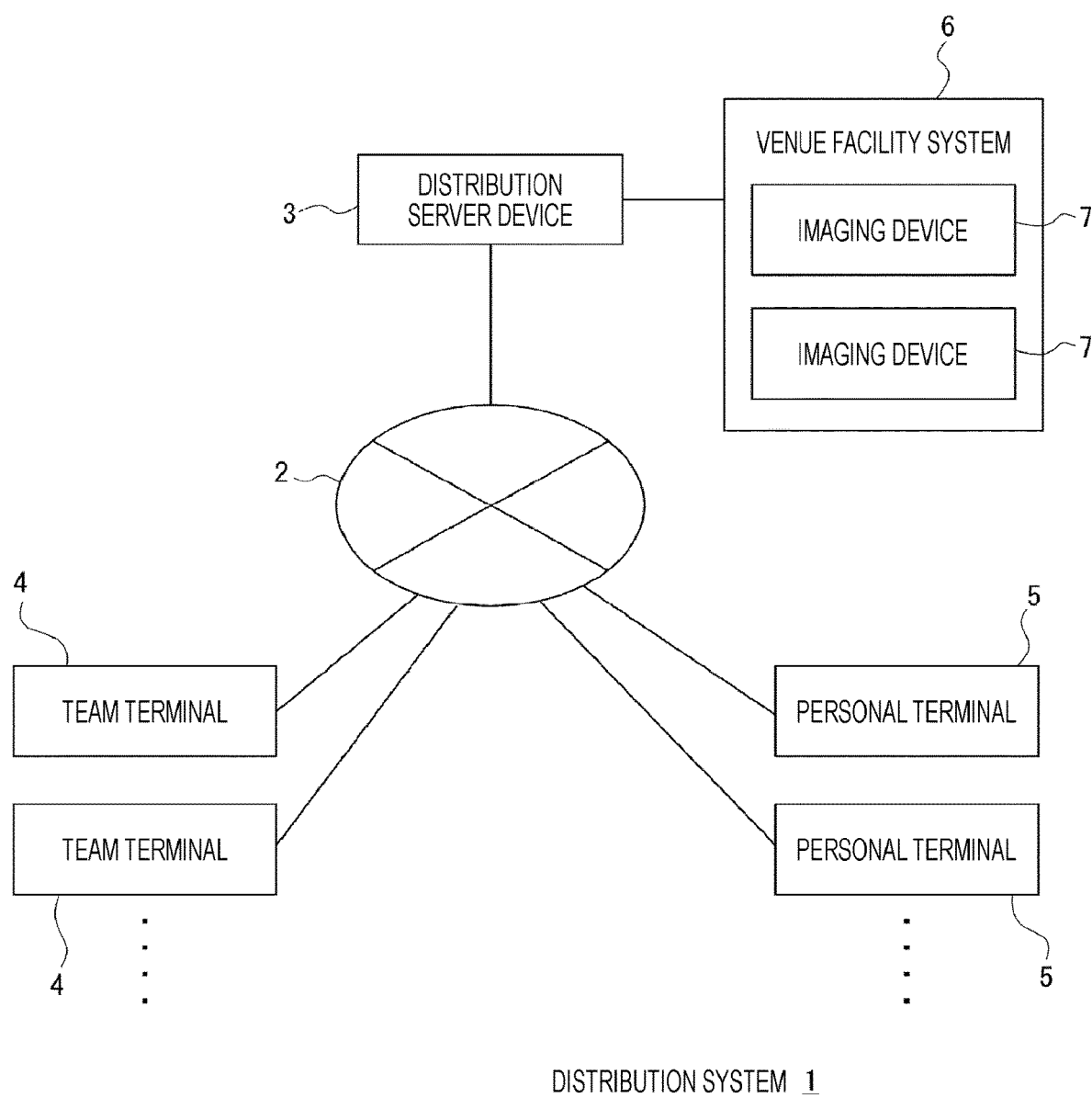
FIG. 1 is a diagram illustrating a configuration of a distribution system according to an embodiment.

A configuration of a distribution system 1 in the present embodiment will be described with reference to FIG. 1. Note that, in the following description, as an example of the distribution system 1, a system that distributes an image regarding swimming as a sport competition will be described. The "image" herein includes both a moving image and a still image.

The distribution system 1 includes a distribution server device 3, a team terminal 4, and a personal terminal 5 which are communicably connected to each other via a communication network 2.

Furthermore, the distribution server device 3 can communicate with a venue facility system 6. The venue facility system 6 includes a plurality of imaging devices 7.

As the communication network 2, for example, the Internet, a home network, a local area network (LAN), a satellite communication network, and other various networks are assumed.

The distribution server device 3 is, for example, an information processing apparatus managed by an operating organization which operates various tournaments and events regarding swimming, and includes a personal computer (PC), a workstation, and the like.

The distribution server device 3 performs schedule management of a swimming tournament, a swimming event, and the like, management of competition events, management of participants (players), and the like. The distribution server device 3 transmits schedule information and information regarding competition events and the participants to the team terminal 4 and the personal terminal 5.

Furthermore, the distribution server device 3 receives an entry request to the tournament and executes an entry process for the tournament.

The distribution server device 3 is a device that distributes an image captured by the imaging device 7 installed in a swimming venue to the team terminal 4 and the personal terminal 5. The distribution server device 3 can communicate with the imaging device 7 included in the venue facility system 6.

Note that communication between the distribution server device 3 and the imaging device 7 may be enabled via a network or may be enabled by being directly connected. Furthermore, the venue facility system 6 may include a management terminal that comprehensively manages each imaging device 7, and the distribution server device 3 may be communicable with the imaging device 7 via a management device.

Furthermore, the venue facility system 6 may be connected to the communication network 2, and the distribution server device 3 may be communicable with the imaging device 7 via the communication network 2.

The distribution server device 3 generates content for distribution (hereinafter, described as "distribution content") by using captured image data acquired from the imaging device 7. The distribution content is, for example, image data obtained by combining the captured image data acquired from the plurality of imaging devices 7, and text information such as caption information and metadata or image data may be superimposed.

The distribution content is content to be displayed on each information processing apparatus, and thus can also be referred to as display content.

The distribution content generated by the distribution server device 3 is appropriately distributed to the team terminal 4 and the personal terminal 5.

The distribution server device 3 may be an information processing apparatus temporarily installed in the venue during a tournament period. Furthermore, in that case, the distribution server device 3 may be configured by cooperation between a permanent type information processing apparatus which is an information processing apparatus owned by the operating organization and executes various processes which are constantly executed aside from the tournament period, such as schedule management, player information management, and entry processing, and a temporary installation type information processing apparatus which is an information processing apparatus temporarily installed in the venue and executes various processes which are executed particularly during the tournament period, such as control of the imaging device 7 and processing on the captured image data.

In the following example, an example in which the distribution server device 3 includes both the permanent type information processing apparatus and the temporary installation type information processing apparatus will be described.

The team terminal 4 is an information processing apparatus owned by a swimming team or a club team, and is, for example, a PC, a personal digital assistant (PDA), or the like. For example, the team terminal 4 can be used only by a user (a staff member or a competitor) belonging to the swimming team, and can make various requests to the distribution server device 3. For example, the various requests include a transmission request for distribution content, a transmission request for tournament information, and the like.

Furthermore, the team terminal 4 can transmit an entry request for the tournament to the distribution server device 3 by designating a tournament, an event, and a competitor.

The team terminal 4 manages information regarding a belonging competitor of the swimming team. For example, the team terminal 4 can transmit a result, participation information, and the like of the belonging competitor in response to a request from the personal terminal 5.

The personal terminal 5 is an information processing apparatus owned by the competitor, and is, for example, a device with a communication function such as a portable terminal device such as a smartphone or a tablet, a mobile phone, a PC, a game device, a video device, or a PDA.

The personal terminal 5 can transmit a request for acquiring a tournament result and personal information to the team terminal 4 to obtain each piece of information. Furthermore, the personal terminal 5 may be configured to be able to receive the tournament information and the distribution content from the distribution server device 3.

Furthermore, the personal terminal 5 may be able to transmit a login request to the team terminal 4 or the distribution server device 3. For example, by transmitting an identification (ID) and a password as login information to each device in order to acquire various types of information, an authentication process is executed in each device.

The venue facility system 6 includes the imaging device 7 installed in the swimming venue. As described above, a management terminal that comprehensively manages each imaging device 7 may be included.

The imaging device 7 is a video camera or the like installed in the swimming venue, and is provided as, for example, an imaging device 7 which images the entire pool, an imaging device 7 which captures an image for every lane, an imaging device 7 which images an electric bulletin board, an imaging device 7 which images spectator seats, or the like.

2. Configuration of Distribution Server Device

A configuration of the distribution server device 3 will be described. As described above, here, an example in which the distribution server device 3 has a management function of the imaging device 7 installed in the swimming venue will be described. For example, the distribution server device 3 includes a plurality of information processing apparatuses.

Figure 2:
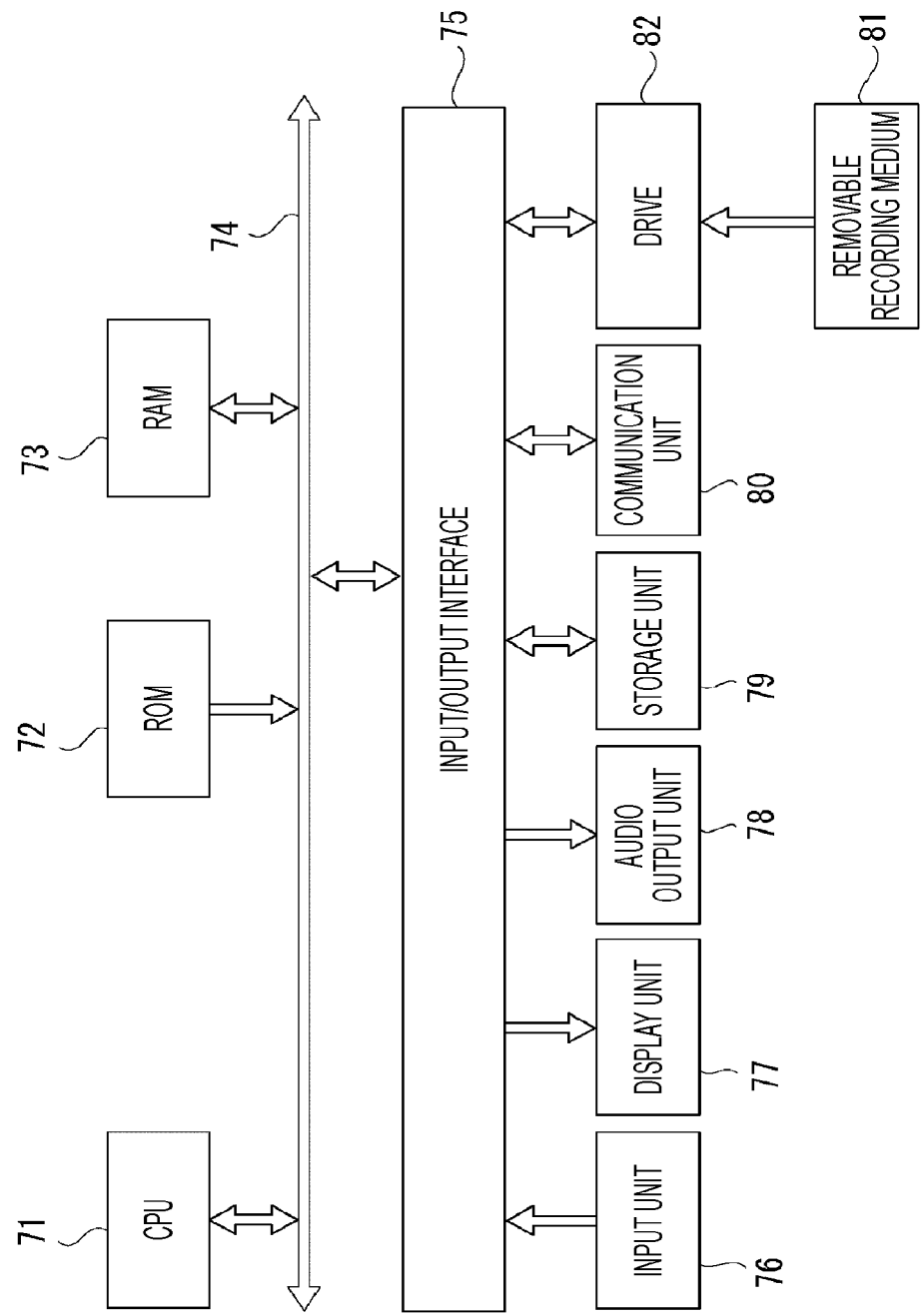
FIG. 2 is a block diagram of an information processing apparatus according to the embodiment.

Each of the plurality of information processing apparatuses has, for example, a configuration as illustrated in FIG. 2.

A CPU 71 of the information processing apparatus executes various processes according to a program stored in a ROM 72 or a program loaded from a storage unit 79 to a RAM 73. The RAM 73 also appropriately stores data and the like necessary for the CPU 71 to execute various processes.

The CPU 71, the ROM 72, and the RAM 73 are connected to one another via a bus 74. An input/output interface 75 is also connected to the bus 74.

An input unit 76 including an operator and an operation device is connected to the input/output interface 75.

For example, various operators and operation devices such as a keyboard, a mouse, a key, a dial, a touch panel, a touch pad, and a remote controller are assumed as the input unit 76.

An operation of the user is detected by the input unit 76, and a signal corresponding to the input operation is interpreted by the CPU 71.

In addition, a display unit 77 including an LCD, an organic EL panel, or the like, and an audio output unit 78 including a speaker or the like are connected to the input/output interface 75 integrally or separately.

The display unit 77 is a display unit which performs various displays, and includes, for example, a display device provided in a housing of the distribution server device 3, a separate display device connected to the distribution server device 3, or the like.

The display unit 77 executes display of an image for various imaging processes, a moving image to be processed, and the like on a display screen on the basis of an instruction from the CPU 71. In addition, the display unit 77 displays various operation menus, icons, messages, and the like, that is, displays as a graphical user interface (GUI) on the basis of an instruction from the CPU 71.

In some cases, the storage unit 79 including a hard disk, a solid-state memory, or the like, and a communication unit 80 including a modem or the like are connected to the input/output interface 75.

The communication unit 80 performs a communication process via a transmission path such as the Internet, wired/wireless communication with various devices, bus communication, and the like.

In the case of the present embodiment, the communication unit 80 has a function of communicating with the imaging device 7.

A drive 82 is also connected to the input/output interface 75 as necessary, and a removable recording medium 81 such as a magnetic disk, an optical disk, a magneto-optical disk, or a semiconductor memory is appropriately mounted.

Various computer programs and the like can be read from the removable recording medium 81 by the drive 82. The computer program and the like read from the removable recording medium 81 are installed in the storage unit 79 as necessary.

In the distribution server device 3, for example, software for the processing of the present disclosure can be installed by network communication by the communication unit 80 or via the removable recording medium 81. Alternatively, the software may be stored in advance in the ROM 72, the storage unit 79, or the like.

Figure 3:
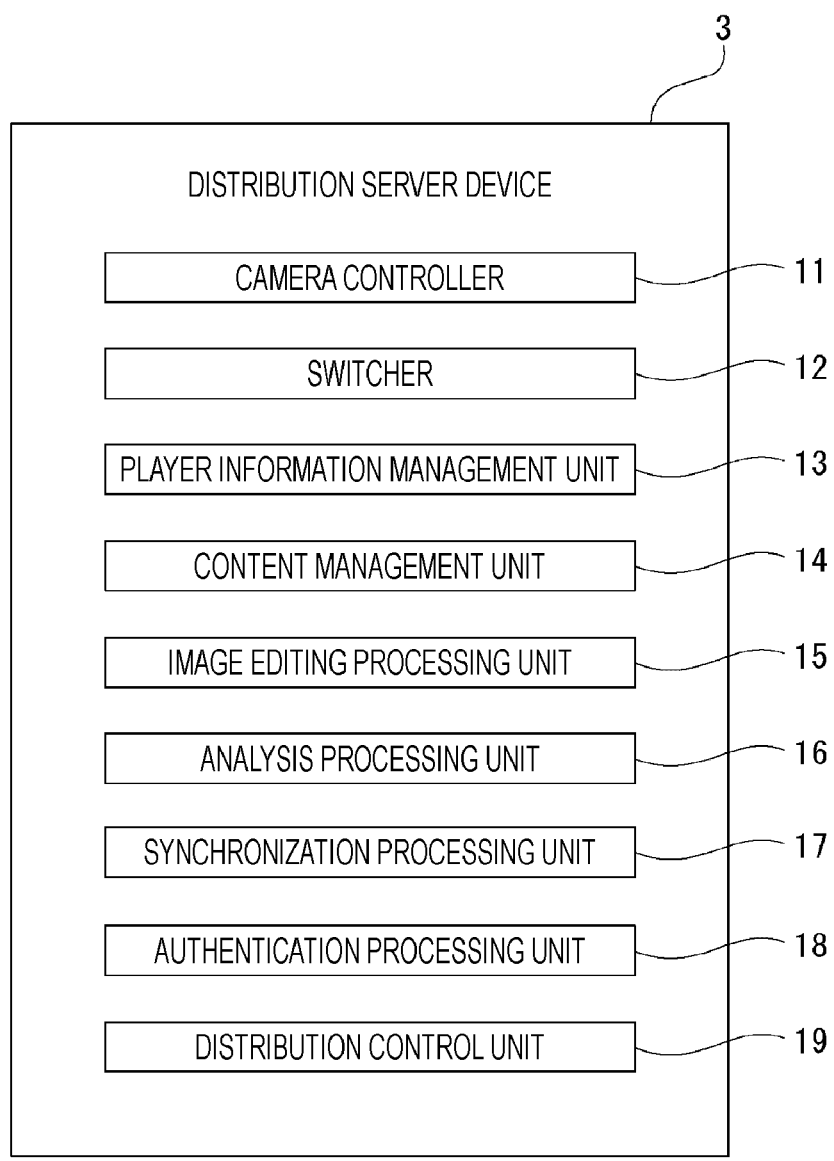
FIG. 3 is a functional block diagram of a distribution server device in the embodiment.

For example, the functional configuration as illustrated in FIG. 3 is constructed in the CPU 71 of the distribution server device 3 by such software (application program).

The distribution server device 3 has each function of a camera controller 11, a switcher 12, a player information management unit 13, a content management unit 14, an image editing processing unit 15, an analysis processing unit 16, a synchronization processing unit 17, an authentication processing unit 18, a distribution control unit 19, and the like.

The camera controller 11 performs a control on the imaging device 7 installed in the venue. Specifically, the control includes a control for causing the imaging device 7 to execute a rotation operation in a pan direction or a tilt direction, a control for executing a zoom-in operation or a zoom-out operation, a control for changing quality of captured image data such as image quality or color tone, and the like. Furthermore, the camera controller 11 can also perform a control of transmitting the captured image data captured by the imaging device 7, and the like.

The switcher 12 executes a process of changing a live distribution image, a process of switching an image to be displayed on a large display installed in the venue, and the like by switching the images of the plurality of imaging devices 7.

Note that the camera controller 11 and the switcher 12 may be realized as independent devices.

The player information management unit 13 manages various types of information regarding players belonging to the operating organization. For example, information, such as a player name, a player ID, team information, an address, a contact address, a date of birth, and an international age at the time of the tournament, for identifying an individual, Information regarding the participated tournament, record information, and the like are used as the player information.

The content management unit 14 manages image content information generated for distribution. The image content is, for example, content generated by combining the captured image data acquired from the plurality of imaging devices 7, distribution content for distribution to the team terminal 4 or the personal terminal 5, and display content to be displayed on each terminal.

The content management unit 14 manages image content, and metadata or caption information associated with the image content. The metadata or caption information are, for example, a subject name (player name), a tournament name, a venue of a tournament, imaging date and time, a swimming event, a course number used by a player, a swimming record, a rank, and the like regarding the image content. Furthermore, information for specifying the imaging device 7 that has imaged the player, imaging setting of the imaging device 7, and the like may be recorded.

The content management unit 14 sets and stores a disclosure range for every image content. As the disclosure range, for example, setting such as "distributable only to the player oneself of the subject", "distributable to the team to which the player belongs", and "distributable to anyone" can be considered.

The image editing processing unit 15 performs an editing process on the captured image data acquired from the imaging device 7. Various types of editing processes can be considered, and for example, the processes include a process of combining a plurality of pieces of captured image data acquired from the plurality of imaging devices 7 to generate one piece of image data, a process of superimposing text information or an image, a process of cutting out an image in a predetermined range from the acquired captured image data, and the like.

For example, the text information to be superimposed includes player information, tournament information, swimming records, and the like.

Furthermore, the image to be superimposed is an image for visually indicating past results of the player as the subject of the acquired captured image data, an image for visually indicating record information of various tournaments and countries, or the like.

The analysis processing unit 16 is a processing unit that performs image analysis on the captured image data acquired from the imaging device 7 and acquires coaching information. For example, in the case of swimming, the number of times of breathing, the number of times of scratching water, the number of times of kicking water, and the like performed while swimming 50 m are acquired by the image analysis. Furthermore, the position of the player and the speed (swimming speed) at that time may be calculated by the image analysis.

These pieces of information are the coaching information that can be used for coaching. In extracting the coaching information, for example, a deep learning method such as convolutional neural network (CNN) may be used.

In a case where the plurality of pieces of captured image data is combined to generate one distribution content, the synchronization processing unit 17 performs a process of synchronizing the plurality of pieces of captured image data.

The authentication processing unit 18 performs an authentication process of determining whether or not the user is a member on the basis of ID information and password information received from another terminal such as the team terminal 4 or the personal terminal 5.

Note that the authentication processing unit 18 may be configured to transmit, for example, a two-dimensional barcode or the like as information indicating a member to a user or a terminal for which the authentication process has succeeded. For example, the user who has received the two-dimensional barcode information can smoothly enter the venue or enter the related person area by holding the two-dimensional barcode over a reader or the like installed in the venue or the like. Furthermore, the two-dimensional barcode can also be used when obtaining imaging permission in the swimming venue.

The distribution control unit 19 acquires image content from a database, and performs a distribution control to distribute the image content to the terminal which has transmitted the distribution request of the image content. Furthermore, the distribution control unit 19 may perform the distribution control on the basis of the disclosure range of the image content.

Furthermore, the distribution control unit 19 may perform a control for live distribution of the captured image data captured in the swimming venue in real time. For example, a live image may be distributed to the user as a family member visiting the swimming venue. At that time, different live images may be distributed for every user. Specifically, for example, the captured image data (entire image) from the imaging device 7 which images the entire pool in a bird's eye view and the captured image data (a zoom-in image, a personal image) from the imaging device 7 which images individual players in a zoom-in mode may be combined in the image editing processing unit 15, and individual image content for every player obtained by the combining may be distributed to each user. Therefore, the user can receive the image content specially created for his/her child.

Note that in the various functions included in the distribution server device 3 described above, at least some functions may be functions provided by cloud computing.

Furthermore, for example, without installing the distribution server device 3 in the swimming venue, the distribution server device 3 may be provided as a stationary server device owned by the operating organization, and the distribution server device 3 may have various functions.

3. Editing Example of Captured Image Data

An example of the image content edited by the image editing processing unit 15 of the distribution server device 3 will be described.

There is a case where the user desires to simultaneously view an image during the competition in which a player related to the user is captured in a zoom-in mode, an image in which the entire race is imaged in a bird's eye view, and information of an electric bulletin board on which a record related to the race is displayed. In order to meet this demand, for example, image content as illustrated in FIG. 4 is generated by editing the captured image data acquired from the imaging device 7.

Figure 4:
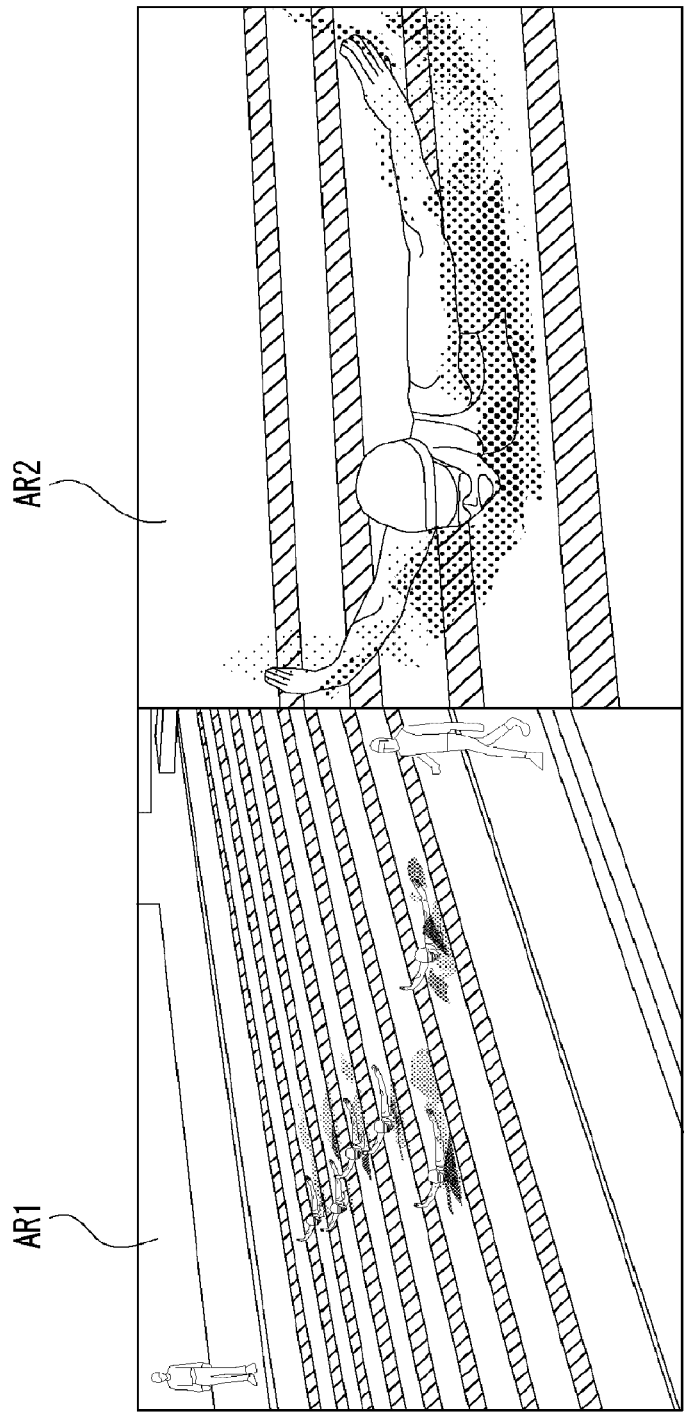
FIG. 4 is an example of distribution content according to the embodiment.

FIG. 4 illustrates a scene of the image content generated for distribution to the user.

The image content includes a plurality of regions. For example, a first region AR1 is a region in which an image for visually recognizing the progress of the entire race is displayed, and the captured image data acquired from the imaging device 7 which that images the entire pool is displayed therein. Hereinafter, the image data generated by combining a plurality of pieces of image data in this manner will be referred to as "composite image data".

In a second region AR2, the captured image data acquired from the imaging device 7 which is capturing the zoom-in image of the individual player is displayed.

Note that, in a case where the image obtained by capturing the entire pool has a sufficiently high resolution, an image obtained by cutting off a specific region in which the individual player is imaged in the image displayed in the first region AR1 and enlarging the region may be displayed in the second region AR2. That is, an image may be displayed in each of the first region AR1 and the second region AR2 by using the captured image data acquired from one imaging device 7.

In FIG. 4, two regions in which the captured image data is displayed are provided, but this is of course an example, and three or more regions may be provided. In this case, for example, as illustrated in FIG. 4, in addition to the first region AR1 and the second region AR2, a third region AR3 in which the captured image data acquired from imaging device 7 which has imaged the electric bulletin board is displayed may be provided.

Furthermore, the respective regions may be set to have the same size or may be set to have different sizes. Furthermore, a certain region may be arranged to be superimposed on another region.

Figure 5:
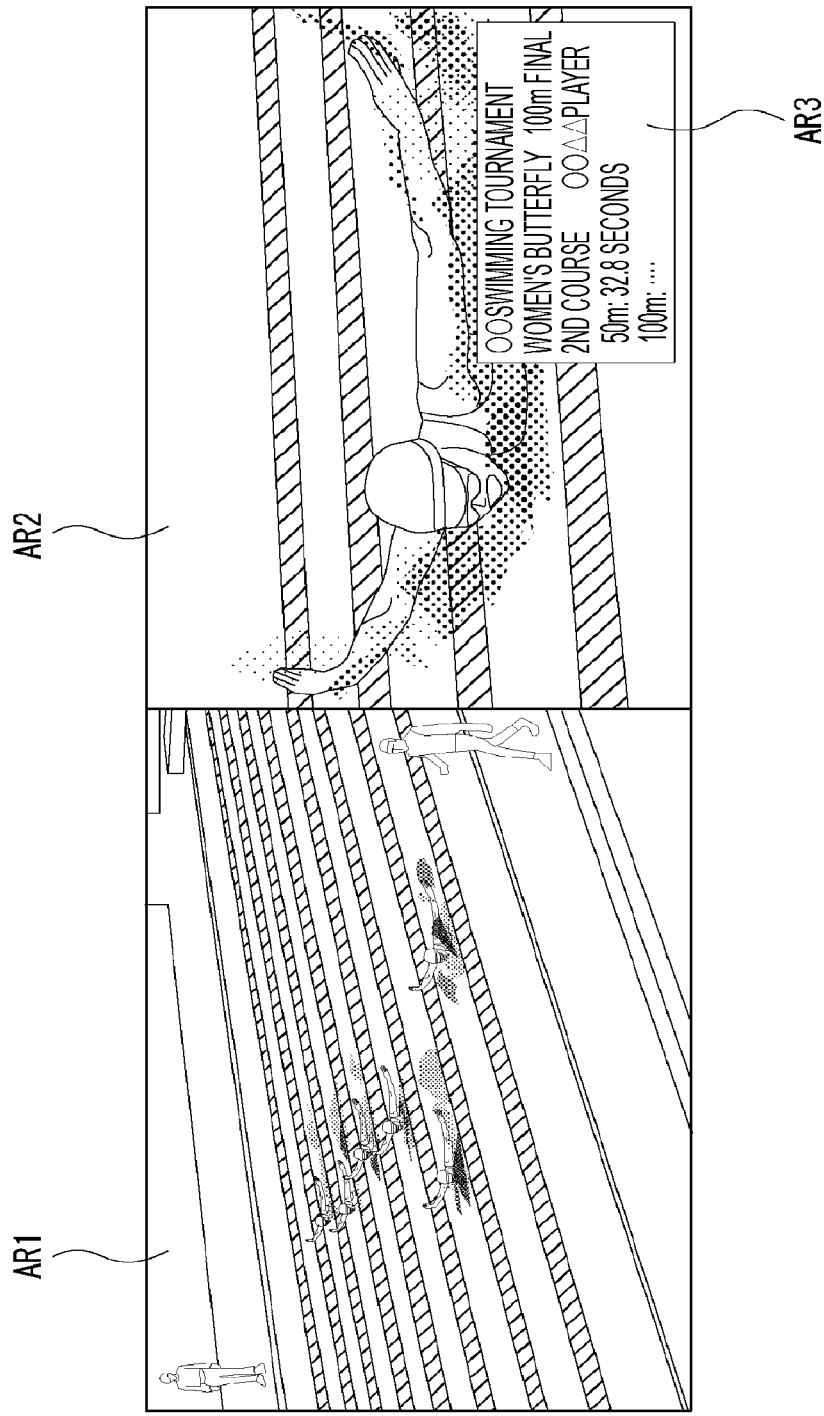
FIG. 5 is another example of the distribution content according to the embodiment.

Note that character information may be displayed instead of an image. An example thereof is illustrated in FIG. 5. The character information is, for example, explanatory information or the like for explaining an image.

FIG. 5 illustrates an example in which the third region AR3 for displaying text information extracted from information displayed on the electric bulletin board is provided in addition to the first region AR1 in which an image captured as a whole in a bird's eye view is displayed and the second region AR2 in which an image obtained by imaging an individual player in a zoom-in mode is displayed.

The third region AR3 is a region to be superimposed and displayed on the second region AR2.

For example, the text information to be displayed as explanatory information in the third region AR3 may be acquired by performing image analysis on the captured image data obtained by imaging the electric bulletin board. Character recognition is performed from the captured image data of the electric bulletin board to obtain the text information. Alternatively, text information to be transmitted for display on the electric bulletin board may be acquired, and the text information to be displayed as explanatory information may be extracted therefrom.

Furthermore, time information may be acquired from a device which acquires the information of the participant participating in the competition from the database and manages the course information (for example, lap time information for every 50 m) of swimming, and the text information may be generated from the acquired information.

In addition, the name of the tournament, the venue of the tournament, the imaging date and time, the swimming event, the player name of the player displayed in the second region AR2, the course number used by the player, the swimming record, the rank, personal-best information, and the like may be acquired as the text information.

In a case where the text information is displayed, the composite image data illustrated in FIG. 4 and the text information may be separately transmitted to other terminals such as the team terminal 4 and the personal terminal 5, and the text information may be superimposed and displayed on the composite image data by processing of the other terminals. In this case, it is easy for the user to freely set the position where the text information is superimposed and to set switching between display and non-display of the text information.

Alternatively, the text information may be transmitted, to another terminal, in the state of being incorporated as the image information into the composite image data in advance by the image editing processing unit 15 of the distribution server device 3.

Furthermore, the text information may be displayed without providing the third region AR3. For example, when the text information is incorporated into the captured image data to be displayed in the second region AR2, it is not necessary to provide the third region AR3 for displaying the text information.

4. Processing Example in Distribution Server Device

4-1. Distribution Content Generation Process

Various processes executed by the distribution server device 3 will be described.

First, a process of generating distribution content will be described with reference to FIG. 6. A distribution content generation process is, for example, a process executed after a swimming tournament, and is a process of generating individual distribution content for every player.

In the distribution content generation process, the distribution server device 3 selects one player in step S101. The distribution content generation process is, for example, a process executed after the end of the tournament by using the captured image data acquired from the plurality of imaging devices 7. Therefore, in step S101, the process is a process of selecting one player from among the players participating in the tournament. Note that, in a case where there is a player participating in a plurality of races in one tournament, for example, in a case where there is a player participating in both a preliminary game and a final game, a process of selecting both the race and the player is executed in step S101.

In step S102, the distribution server device 3 executes a process of selecting the entire image. Specifically, the captured image data acquired from the imaging device 7 which has captured the entire image in a bird's eye view is selected. Furthermore, the acquired captured image data is used for a specific race in which the player selected in step S101 participates.

In step S103, the distribution server device 3 executes a process of selecting a personal image of the player. This process is captured image data for the player specified in step S101. In the case of a player participating in a plurality of races, one captured image data is selected on the basis of the race information selected in step S101.

In step S104, the distribution server device 3 acquires text information. This process is performed, for example, to acquire the text information to be displayed in the third region AR3 of FIG. 5. The information to be acquired is, for example, information such as swimming venue information, a tournament name, race information, a course number used by the player in competition, a player name, result information in this race such as lap time, and a personal best.

Note that, in a case where the text information is not used, the process of step 104 need not be executed.

In step S105, the distribution server device 3 performs a process of combining the captured image data. By this process, the distribution content as illustrated in FIG. 4 or 5 is generated.

The generated distribution content is stored in the storage unit 79 or the like by the distribution server device 3 executing the process of step S106.

In step S107, the distribution server device 3 determines whether or not the above-described various types of processes have been completed for all the players participating in the tournament. In a case where there is still an unprocessed player, the distribution server device 3 returns to the process of step S101.

Figure 6:
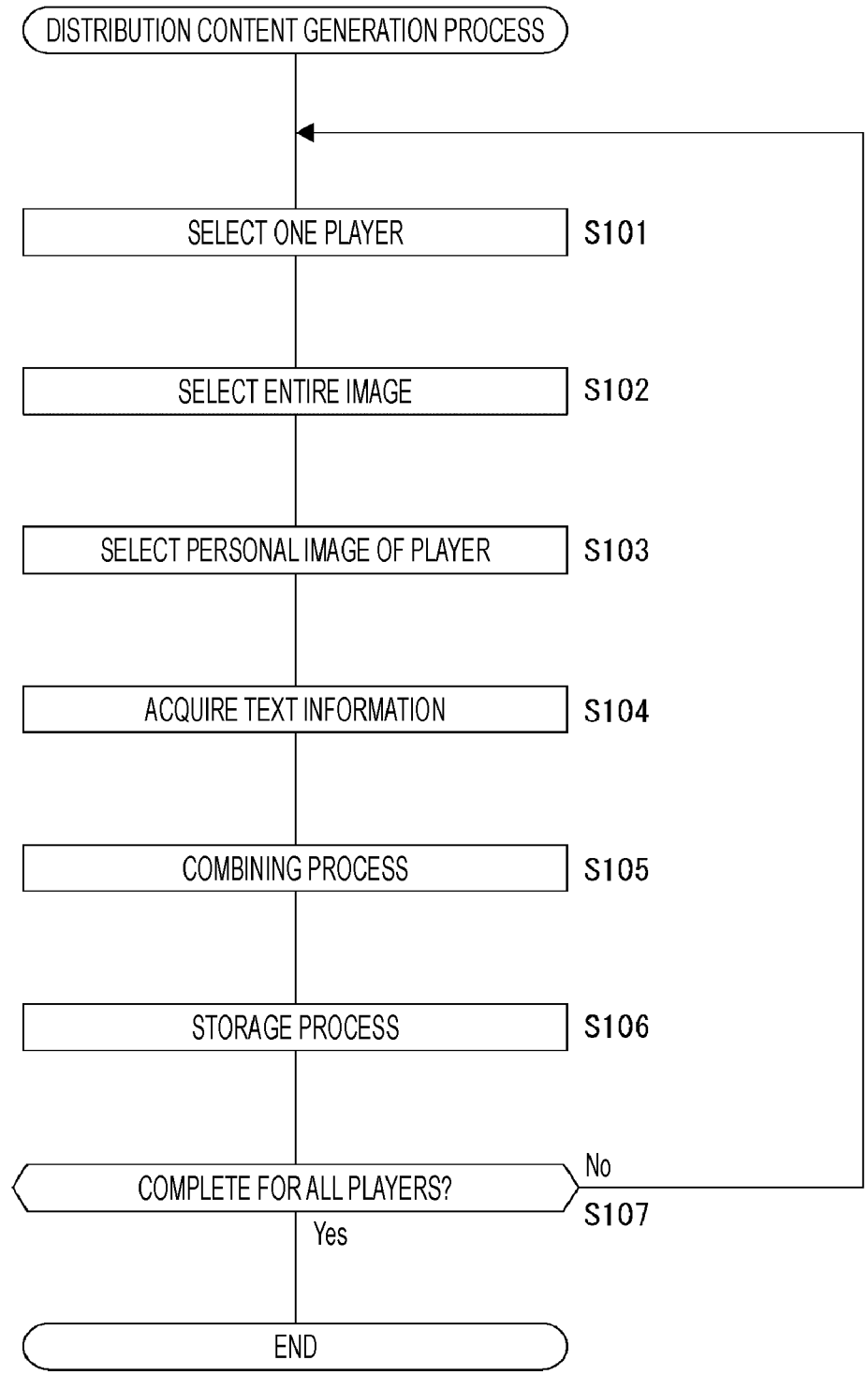
FIG. 6 is a flowchart illustrating an example of a distribution content generation process according to the embodiment.

On the other hand, in a case where there is no unprocessed player, the distribution server device 3 ends the series of processing illustrated in FIG. 6.

By executing the distribution content generation process illustrated in FIG. 6, different distribution content is generated for every player participating in the tournament.

Note that, although the example in which the process illustrated in FIG. 6 is executed for all the players who have participated in the tournament is described, the process may be executed for some of the players. Furthermore, when a distribution request of the distribution content is received from the team terminal 4 or the personal terminal 5, the distribution request may be appropriately executed. In a case where the distribution content generation process illustrated in FIG. 6 is executed in response to the reception of the distribution request, unnecessary processing does not need to be executed, so that the processing load of the distribution server device 3 is reduced.

4-2. Coaching Information Extraction Process

A coaching information extraction process executed by the distribution server device 3 will be described with reference to FIG. 7. The coaching information extraction process is a process of extracting information used for coaching by analyzing the captured image data acquired from the imaging device 7. The coaching information extraction process is, for example, a process executed after the tournament.

In step S201, the distribution server device 3 selects one player. This process is a process similar to the process of step S101 in FIG. 6, and is a process of selecting one player who has participated in the tournament.

In step S202, the distribution server device 3 selects the personal image of the player. This process is a process similar to the process of step S102 in FIG. 6.

In step S203, the distribution server device 3 performs an image analysis process. The image analysis process is a process of analyzing the captured image data selected in step S202 and extracting a characteristic amount. In the analysis, for example, a deep learning method such as CNN may be used.

In step S204, the distribution server device 3 extracts coaching information. In this process, the number of times of breathing, the number of times of scratching water, the number of times of kicking water, and the like are extracted as the coaching information on the basis of the analysis result of the previous image analysis process. Furthermore, a change in the speed of swimming from the start of the competition to the end may be extracted.

In step S205, the distribution server device 3 executes a process of storing the coaching information. Specifically, the coaching information is stored in association with the tournament, the race, or the like in which the player has participated.

In step S206, the distribution server device 3 determines whether or not the above-described various types of processes have been completed for all the players participating in the tournament. In a case where there is still an unprocessed player, the distribution server device 3 returns to the process of step S201.

Figure 7:
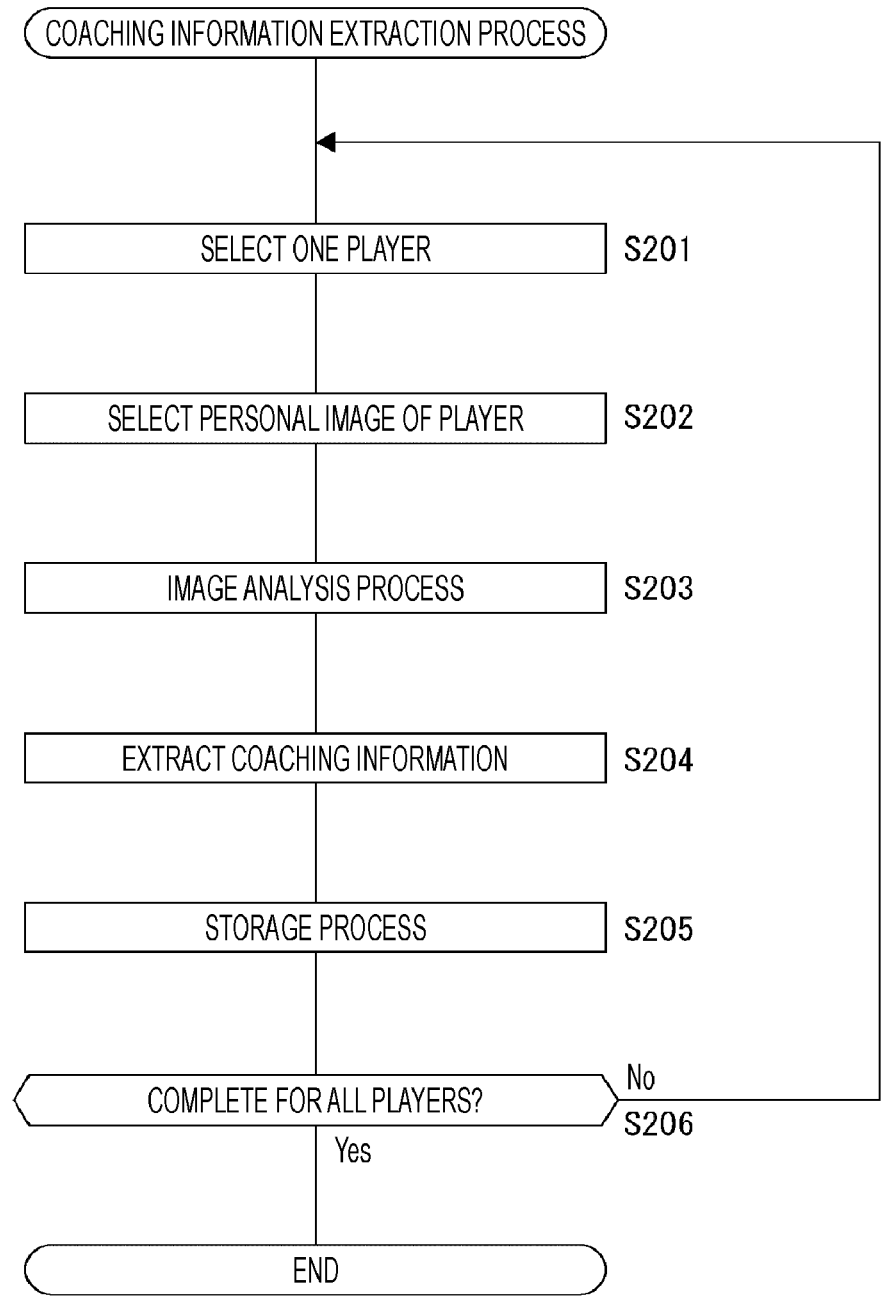
FIG. 7 is a flowchart illustrating an example of a coaching information extraction process according to the embodiment.

On the other hand, in a case where there is no unprocessed player, the distribution server device 3 ends the series of processing illustrated in FIG. 7.

By executing the coaching information extraction process illustrated in FIG. 7, the coaching information for every player participating in the tournament is extracted.

Note that, although the example in which the process illustrated in FIG. 7 is executed for all the players who have participated in the tournament is described, the process may be executed for some of the players. Furthermore, when a transmission request of the coaching information is received from the team terminal 4 or the personal terminal 5, the transmission request may be appropriately executed. In a case where the coaching information extraction process illustrated in FIG. 7 is executed in response to the reception of the transmission request, unnecessary processing does not need to be executed, so that the processing load of the distribution server device 3 is reduced.

Note that the coaching information extracted here may be displayed as text information in the third region AR3 illustrated in FIG. 5.

4-3. Request Responding Process

The distribution server device 3 receives various requests from the team terminal 4 or the personal terminal 5. Therefore, the distribution server device 3 confirms the reception of various requests and executes a responding process for every request.

Figure 8:
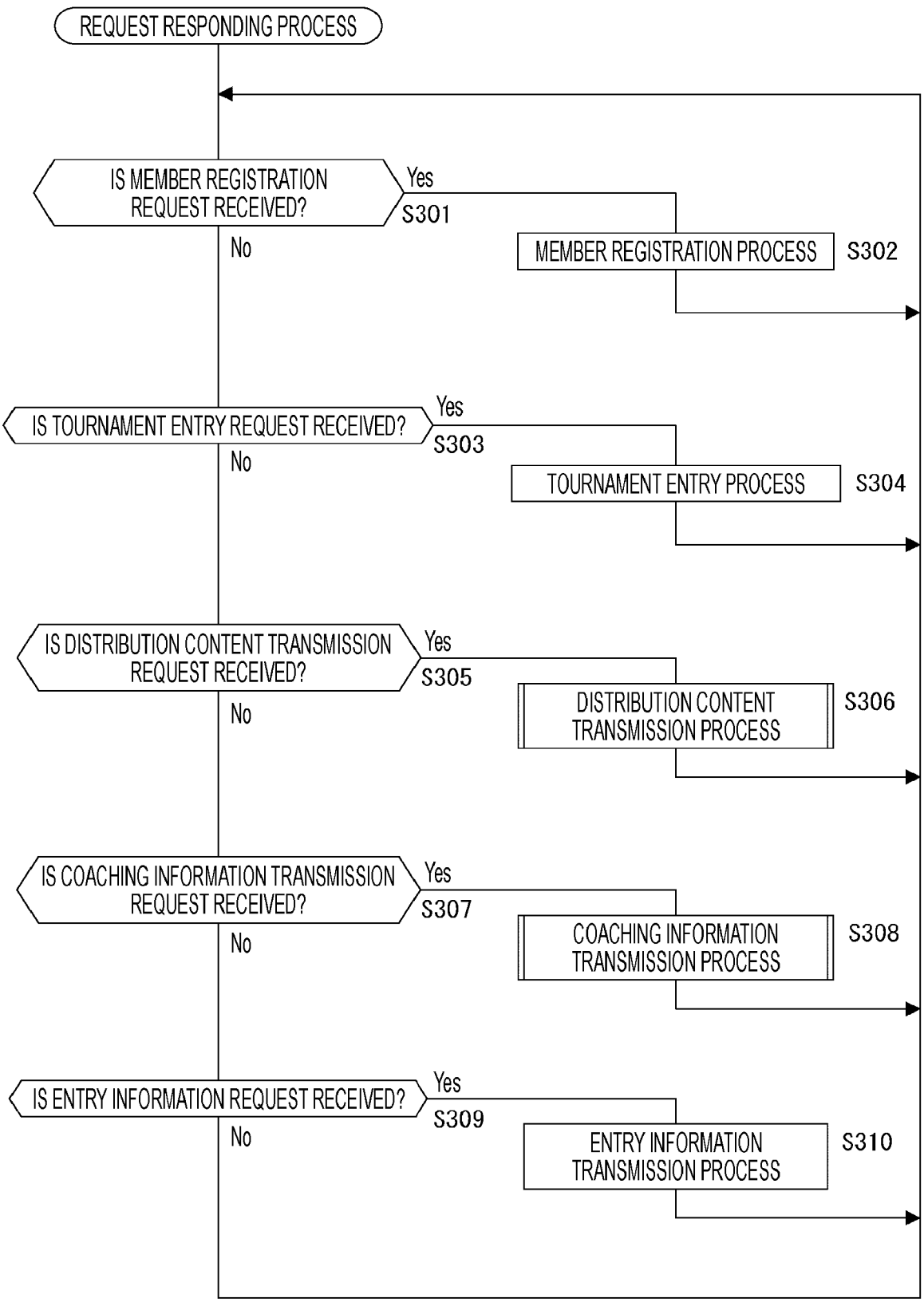
FIG. 8 is a flowchart illustrating an example of a request responding process according to the embodiment.

An example of the request responding process executed by the distribution server device 3 is illustrated in FIG. 8.

In step S301, the distribution server device 3 determines whether or not a member registration request has been received. In a case where it is determined that the member registration request has been received, the distribution server device 3 executes a member registration process of step S302 as a responding process.

In the member registration process, for example, web page data for member registration is transmitted to another information processing apparatus that has transmitted the request. Therefore, a web page for member registration is displayed in the another information processing apparatus.

Furthermore, in the member registration process, a process of receiving the member information input in the another information processing apparatus and confirming whether the input information is incomplete, a process of prompting reinput in a case where the input information is incomplete, a process of registering new member information in a member database in a case where there is no problem in the input information, and the like are executed.

Furthermore, in the member registration process, a process or the like of issuing an ID and a password for performing login for enabling various services is also executed.

After executing the process of step S302, the distribution server device 3 returns to the process of step S301 again.

In a case where it is determined in step S301 that the member registration request has not been received, the distribution server device 3 determines in step S303 whether or not a tournament entry request has been received. In a case where it is determined that the tournament entry request has been received, the distribution server device 3 executes a tournament entry process of step S304 as a responding process.

In the tournament entry process, for example, web page data for performing a competition entry application is transmitted to another information processing apparatus which has received the request. Therefore, a web page for applying for the tournament entry is displayed on the another information processing apparatus.

In the web page for performing the tournament entry application, for example, an operation of selecting a tournament as an entry target or an operation of inputting a player name, a player ID, and the like to be entered is possible. The distribution server device 3 receives each piece of input information, and completes the tournament entry by registering the information in the database which manages players participating in the tournament.

Furthermore, in a case where an entry to the tournament cannot be made due to a result or the like, web page data for a notification that an entry cannot be made is transmitted to the another information processing apparatus.

After executing the process of step S304, the distribution server device 3 returns to the process of step S301 again.

In a case where it is determined in step S303 that the tournament entry request has not been received, the distribution server device 3 determines in step S305 whether or not a distribution content transmission request has been received. In a case where it is determined that the distribution content transmission request has been received, the distribution server device 3 executes a distribution content transmission process of step S306 as a responding process.

Figure 9:
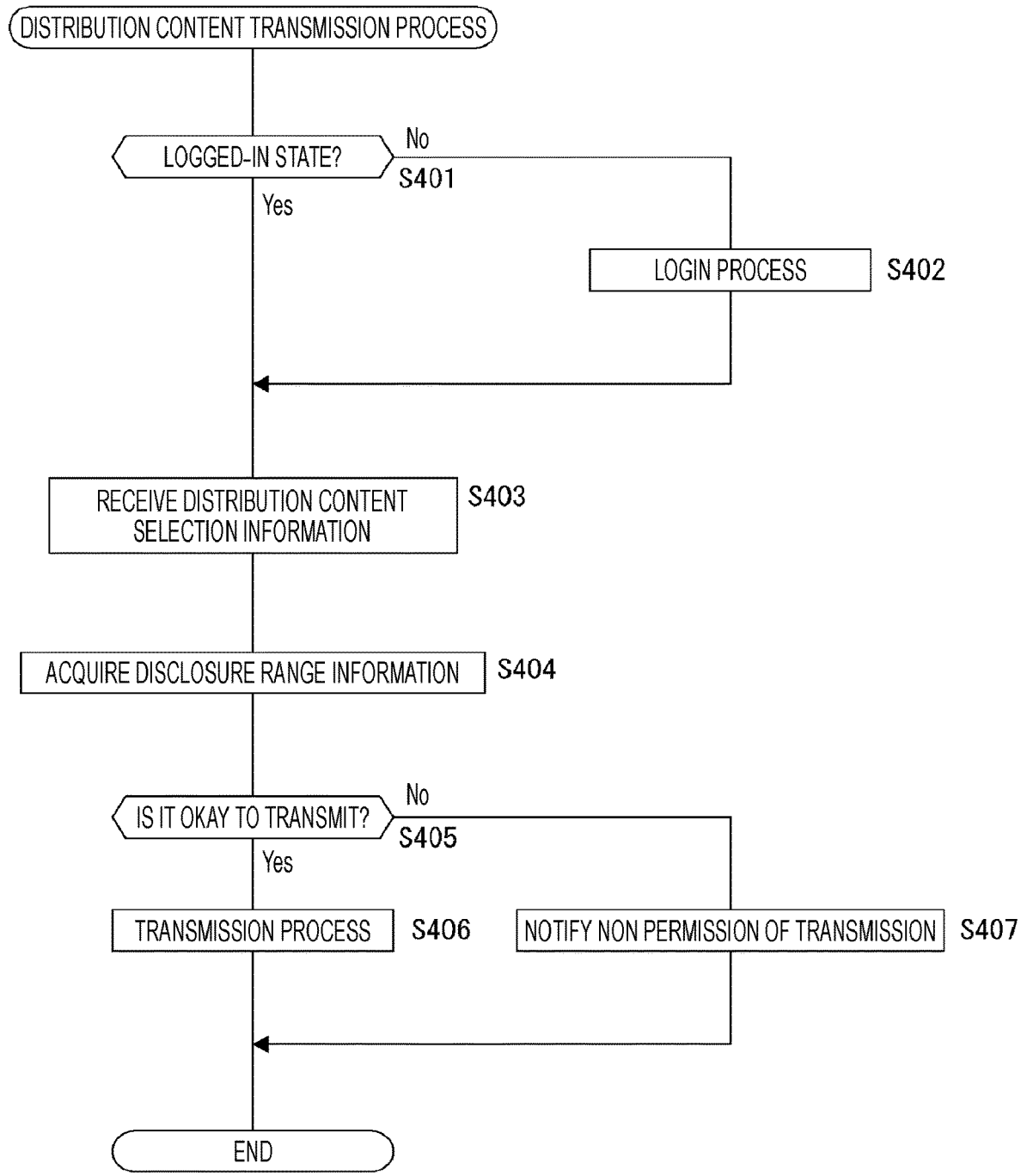
FIG. 9 is a flowchart illustrating an example of a distribution content transmission process according to the embodiment.

An example of the distribution content transmission process will be described with reference to FIG. 9.

In step S401, the distribution server device 3 determines whether or not a user who has requested the transmission of the distribution content is in a logged-in state.

In a case where the user is not in the logged-in state, the distribution server device 3 executes a login process in step S402.

In the login process, an ID and a password are received from another information processing apparatus used by the user who has made the request, and collation with information stored in a database for login is performed to determine whether or not to permit login.

Whether or not to permit login is transmitted to the another information processing apparatus that has made the request. Therefore, login success/failure information is displayed in the another information processing apparatus.

After the login process is normally ended, or in a case where it is determined in step S401 that the user is a user who has already been in the logged-in state, the distribution server device 3 receives distribution content selection information in step S403. The distribution content selection information is information for selecting one piece of distribution content from a plurality of pieces of distribution content, and is, for example, information designated by the user as to the player, the tournament, and the race for which distribution content is desired to be transmitted.

After receiving the distribution content selection information, the distribution server device 3 executes a process of acquiring disclosure range information of the designated distribution content in step S404. The disclosure range information is, for example, information stored in the database in association with the distribution content.

In step S405, the distribution server device 3 determines whether or not the designated distribution content may be transmitted. The determination as to whether or not to permit transmission is made on the basis of the requesting user who has made the transmission request and the disclosure range information. For example, in a case where the user who has made the distribution request is the player oneself, the transmission of the distribution content is permitted assuming that the requesting user is included in the disclosure range.

Furthermore, in a case where the requesting user is a family member of the player and is permitted since the disclosure range also includes the family member, the transmission of the distribution content is permitted.

On the other hand, in a case where the requesting user is a person other than the player, and the disclosure range only includes the person oneself or up to the team, it is assumed that the requesting user is not included in the disclosure range, and the transmission of the distribution content is not permitted.

Note that, in a case where the disclosure range is all users, the transmission of the distribution content is permitted regardless of the requesting user.

In a case where the transmission of the distribution content is permitted, the distribution server device 3 transmits the distribution content in step S406. On the other hand, in a case where the transmission of the distribution content is not permitted, the distribution server device 3 performs a process of transmitting the fact that the transmission of the distribution content is not permitted to the information processing apparatus which has made the request in step S407.

The description returns to FIG. 8.

After executing the distribution content transmission process in step S306, the distribution server device 3 returns to the process of step S301 and determines whether or not various requests have been received.

In a case where it is determined that the distribution content transmission request has not been received, the distribution server device 3 determines in step S307 whether or not a coaching information transmission request has been received. In a case where it is determined that the coaching information transmission request has been received, the distribution server device 3 executes a coaching information transmission process of step S308 as a responding process.

Figure 10:
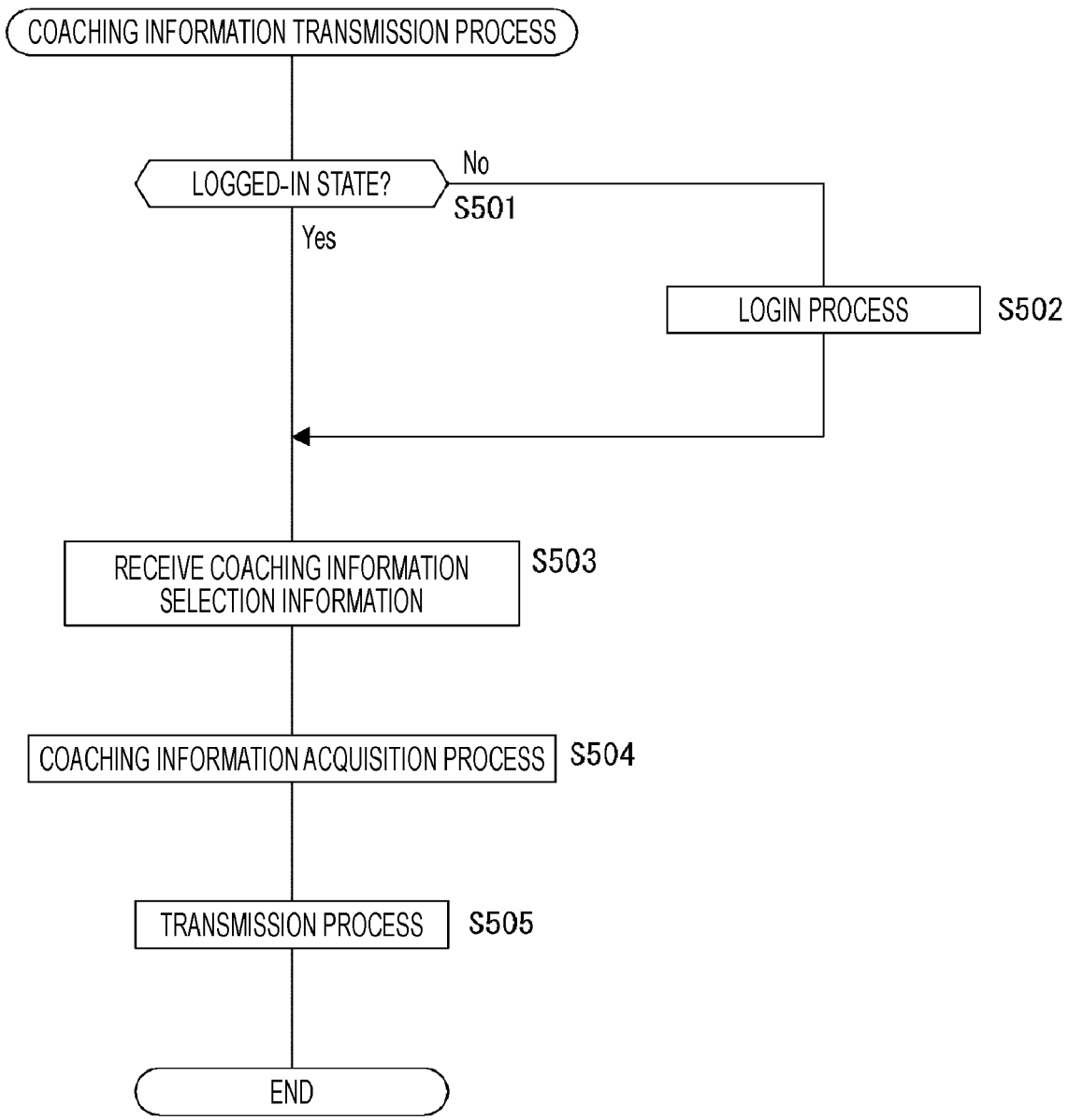
FIG. 10 is a flowchart illustrating an example of a coaching information transmission process according to the embodiment.

An example of the coaching information transmission process will be described with reference to FIG. 10.

In step S501, the distribution server device 3 determines whether or not the user who has requested the transmission of the coaching information is in the logged-in state, and executes the login process in step S502 as necessary. These processes are similar to the processes of steps S401 and S402 in FIG. 9.

In a case where the login process is normally ended, or in a case where it is determined in step S501 that the user is a user who has already been in the logged-in state, the distribution server device 3 receives coaching information selection information for selecting the type of the coaching information in step S503. This information is information for specifying the coaching information the user desires, and is information including at least a tournament name, a race name, a player name, or the like for specifying a targeted performance.

Furthermore, the coaching information selection information may include information for specifying the item selected by the user from among items such as a position of entering water at the start, the number of times of breathing, the number of times of scratching water, the number of times of kicking water, a timing of starting to stretch a hand for a turn, a start position of the turn, and a change in a swimming speed.

By receiving these pieces of coaching information selection information, the distribution server device 3 can grasp which information is to be transmitted from among a plurality of pieces of coaching information.

In step S504, the distribution server device 3 acquires the coaching information on the basis of the information received in step S503.

Subsequently, in step S505, the distribution server device 3 transmits the coaching information.

Note that the disclosure range may be set in the coaching information. In this case, after step S503, it is only required to execute a process of determining whether or not the specified coaching information may be transmitted, for example, the processes of steps S404 and S405 in FIG. 9. Then, only in a case where it is determined that transmission is possible, it is only required to execute the processes of step S504 and step S505.

The description returns to FIG. 8.

After executing the coaching information transmission process of step S308, the distribution server device 3 returns to the process of step S301 again.

In step S309, the distribution server device 3 which has determined that the coaching information transmission request has not been received determines whether or not an entry information request has been received. The request for the entry information is made by, for example, a player scheduled to participate in the tournament, and is a request to transmit various types of information and the like regarding the tournament scheduled to participate.

In a case where it is determined that the entry information request has been received, in step S310, the distribution server device 3 executes an entry information transmission process. The entry information transmission process is a process of transmitting, to another information processing apparatus, information necessary according to the user who has made the request. Note that the transmission target of the entry information may be restricted from the viewpoint of personal information protection. In this case, when the transmission request is received from a non-target user, the entry information is not transmitted.

After receiving the entry information request or determining that the entry information request has not been received, the distribution server device 3 returns to the process of step S301.

The distribution server device 3 repeatedly executes each process of steps S301, S303, S305, S307, and S309 illustrated in FIG. 8 to determine whether or not various requests have been received from another information processing apparatus, and appropriately executes a responding process.

Note that reception of a change request of the player information and reception of a withdrawal request may be monitored in addition to those illustrated in FIG. 8.

5. Live Distribution

The distribution server device 3 may have a function of performing live distribution (streaming distribution) on the day of the tournament. In this case, an example of processing executed by the distribution server device 3 for live distribution will be described with reference to FIG. 11.

In step S601, the distribution server device 3 determines whether or not the user who has requested the live distribution is in the logged-in state, and in step S602, the distribution server device 3 appropriately performs a login process. These processes are similar to the processes of steps S401 and S402 in FIG. 9.

After the requesting user enters the logged-in state, the distribution server device 3 receives player selection information in step S603. The player selection information is information for selecting a player desired for the live distribution from among players currently competing, and is designated by the requesting user, for example.

After receiving the player selection information, in step S604, the distribution server device 3 performs a process of combining the captured image data. Therefore, for example, the composite image data as illustrated in FIGS. 4 and 5 is generated.

In step S605, the combined image data is distributed to each user by the distribution server device 3. The distribution target terminal is, for example, the team terminal 4 or the personal terminal 5 used by the requesting user.

In step S606, the distribution server device 3 determines whether or not to end the live distribution. The live distribution ends, for example, when the competition ends. Alternatively, the live distribution ends when the user performs an operation for ending the distribution.

In a case where the live distribution is not ended, the distribution server device 3 executes each process of steps S604 and S605 again.

The processes of steps S604 and S605 are executed, for example, for every frame in the captured image data.

On the other hand, in a case where it is determined to end the live distribution, in step S607, the distribution server device 3 executes a process of ending the live distribution.

Note that, for live distribution, it is desirable to use a line such as 5th generation (5G) capable of performing high-speed, large-capacity, low-delay, and other connection communication, for example, as compared with a line such as 4th generation (4G). Therefore, it is possible to perform comfortable viewing.

Furthermore, in some cases, it is preferable to perform the live distribution to the user in a competition venue. For example, a top player is often displayed on a large monitor installed in the venue during the competition, and a person related to another player cannot see an image that the person desires to see. Therefore, it is conceivable to watch the competition of the player whom one wants to watch with naked eyes, but it may be difficult to watch due to a long distance from the player, or it may be difficult to watch due to an influence of water splash or the like in the case of swimming. In this regard, it is conceivable to perform the live distribution also to users in the competition venue.

In a case where the live distribution is performed only for the users in the venue, it is preferable to use a local 5G (private 5G) line, a local 4G/LTE (private 4G/LTE) line, or the like constructed in a limited range such as in the venue. Therefore, it is possible to perform high-speed and secure distribution without using the network of a communication carrier.

Note that, for the live distribution, different captured image data and composite image data are transmitted for every player, but the distribution target may be limited. For example, the composite image data for a certain player may be distributed only to the family member. In that case, after the selection information of the player distributed is received in step S603, a process of determining whether or not the currently logged-in user is appropriate as the distribution target may be executed, and each process in and after step S604 may be executed only in a case where the currently logged-in user is determined to be appropriate.

6. Modification 6-1. First Modification of Editing Example of Captured Image Data Although the editing example of the captured image data has been described with reference to FIGS. 4 and 5, another editing example will be described here with reference to FIG. 12.

Figure 12:
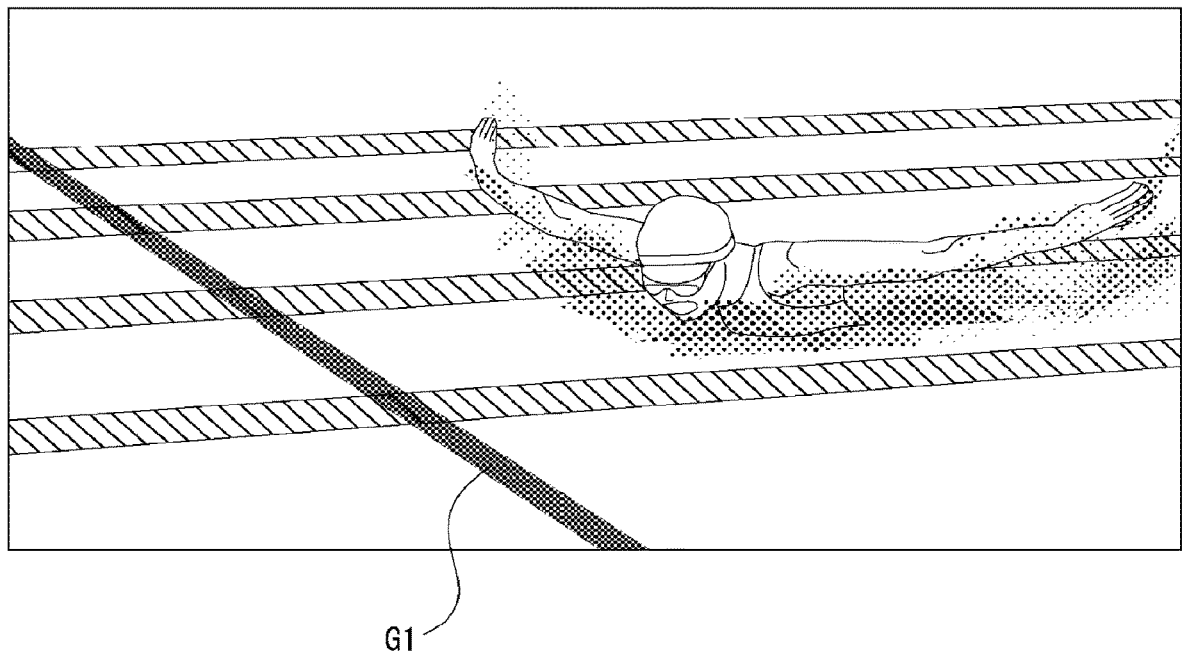
FIG. 12 is a diagram for describing a first modification of an editing example of captured image data according to the embodiment.

In FIG. 12, an image G1 for indicating a target record or a reference record is superimposed and displayed on an image obtained by imaging a player in a zoom-in mode. The image G1 is a line for indicating the target record or the reference record, and is displayed on the front side, the rear side, or the like of the player of the subject in the traveling direction. Alternatively, a line indicating the position of the player competing at the top position in the race may be used as the image G1.

In the example illustrated in FIG. 12, a line as the image G1 indicating the target record of the player is displayed on the front side of the player, and the user who has browsed the distribution content can understand that the player is behind the target record by checking a positional relationship between the image G1 and the player.

In order to superimpose the image G1, first, it is necessary to calculate a superimposed position of the image G1. Specifically, the superimposed position of the image G1 is calculated from a lap time or a goal time of a record such as the target record or the reference record, a current position of the player who is the subject, and an elapsed time from the start. Therefore, for example, a position 1 m ahead of the player who is the subject is calculated as the superimposed position.

Next, which position in the image is the position 1 m ahead is grasped. In order to calculate the superimposed position of the image, for example, the information acquired from the imaging device 7 which has captured the captured image may be used, or the image analysis may be performed.

In this manner, the superimposed position of the image G1 is calculated.

An image generated by superimposing the image G1 is provided to the user as image content. For example, in the distribution content transmission process of FIG. 9, the user may select the distribution content in which the image G1 is superimposed and displayed as in the present example. Furthermore, in the coaching information transmission process illustrated in FIG. 10, the user may select, as the coaching information, the image content in which the image G1 is superimposed and displayed as in the present example.

Figure 11:
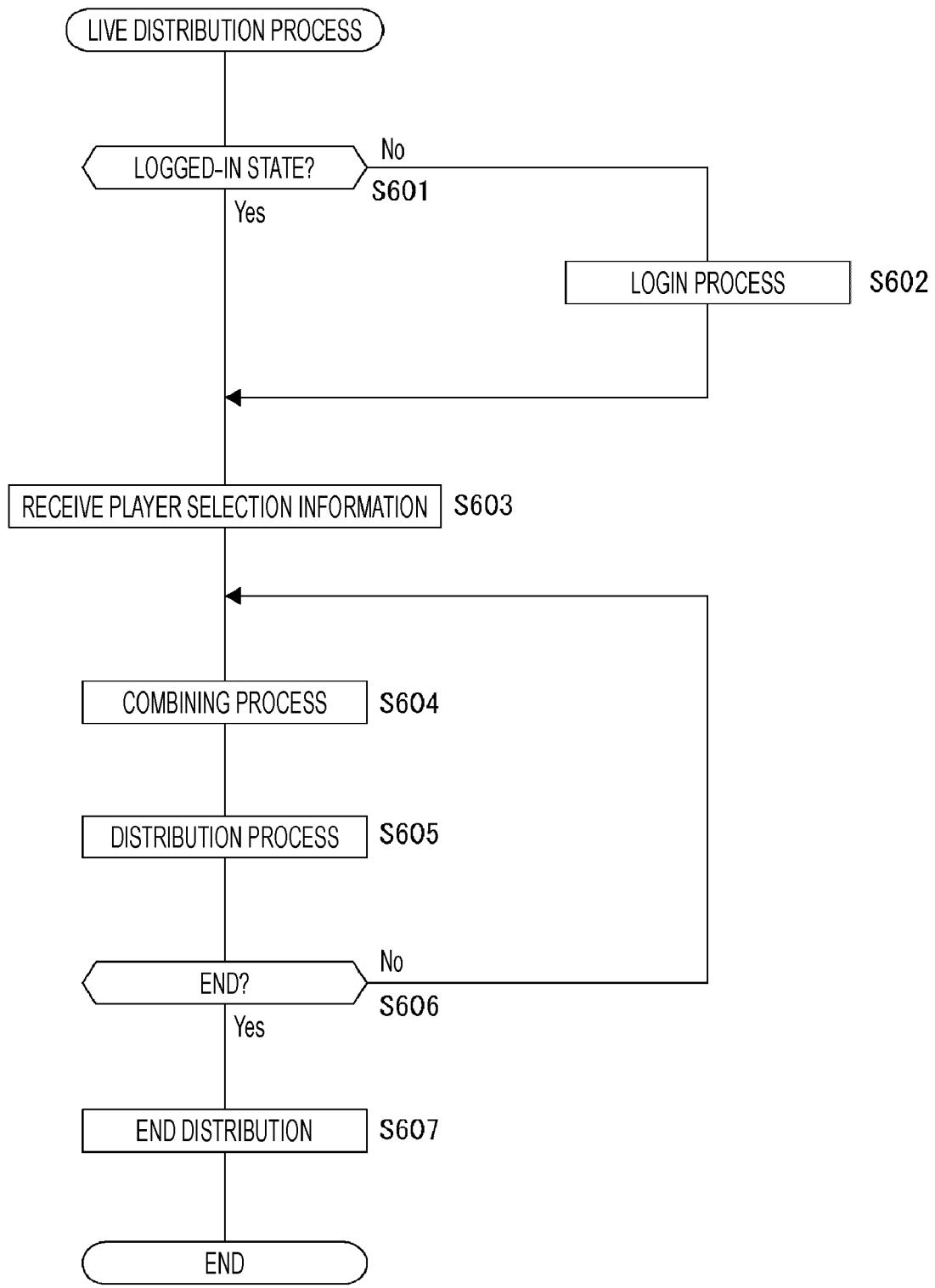
FIG. 11 is a flowchart illustrating an example of a live distribution process according to the embodiment.

Alternatively, in the live distribution process of FIG. 11, the content on which the image G1 is superimposed may be distributed in real time.

Note that, in FIG. 12, an example has been described in which the image G1 is superimposed on the image obtained by imaging the player in a zoom-in mode, but the image G1 may be superimposed and displayed on the image obtained by imaging the entire pool displayed in the first region AR1 of FIG. 4 or the first region AR1 of FIG. 5. Of course, the image G1 may be superimposed on both the image obtained by imaging the entire pool displayed in the first region AR1 and the zoom-in image of the player displayed in the second region AR2. Furthermore, first, the image G1 is superimposed on the zoom-in image of the player displayed in the second region AR2, but in a case where the current position of the player and the position based on the reference record or the target record deviate from each other, and the image G1 cannot be superimposed on the zoom-in image displayed in the second region AR2, the image G1 may be switched to be superimposed on the entire image displayed in the first region AR1.

Note that instead of superimposing the image G1 for indicating the target record or the reference record, a plurality of images may be displayed. For example, the images may be combined such that the captured image data obtained by imaging the swimming at the time of achieving the personal best of the player and the captured image data of the current race of the same player are displayed side by side. Therefore, it is possible to find a difference in breathing timing and a difference in hand scratching timing.

Of course, the images may be combined such that captured image data of another player is displayed side by side. For example, a configuration may be made such that coaching information for a certain player is obtained by combining the captured image data obtained by imaging the swimming of a certain player and the captured image data obtained by imaging the swimming of a world's top swimmer.

6-2. Second Modification of Editing Example of Captured Image Data

In each of the above-described examples, an example has been described in which the image content illustrated in FIGS. 4 and 5 is generated, for example, by using the captured image data acquired from the imaging device 7 installed in the venue.

In the present modification, an example will be described in which image content is generated by using the captured image data captured by an imaging device owned by an individual user.

Figure 13:
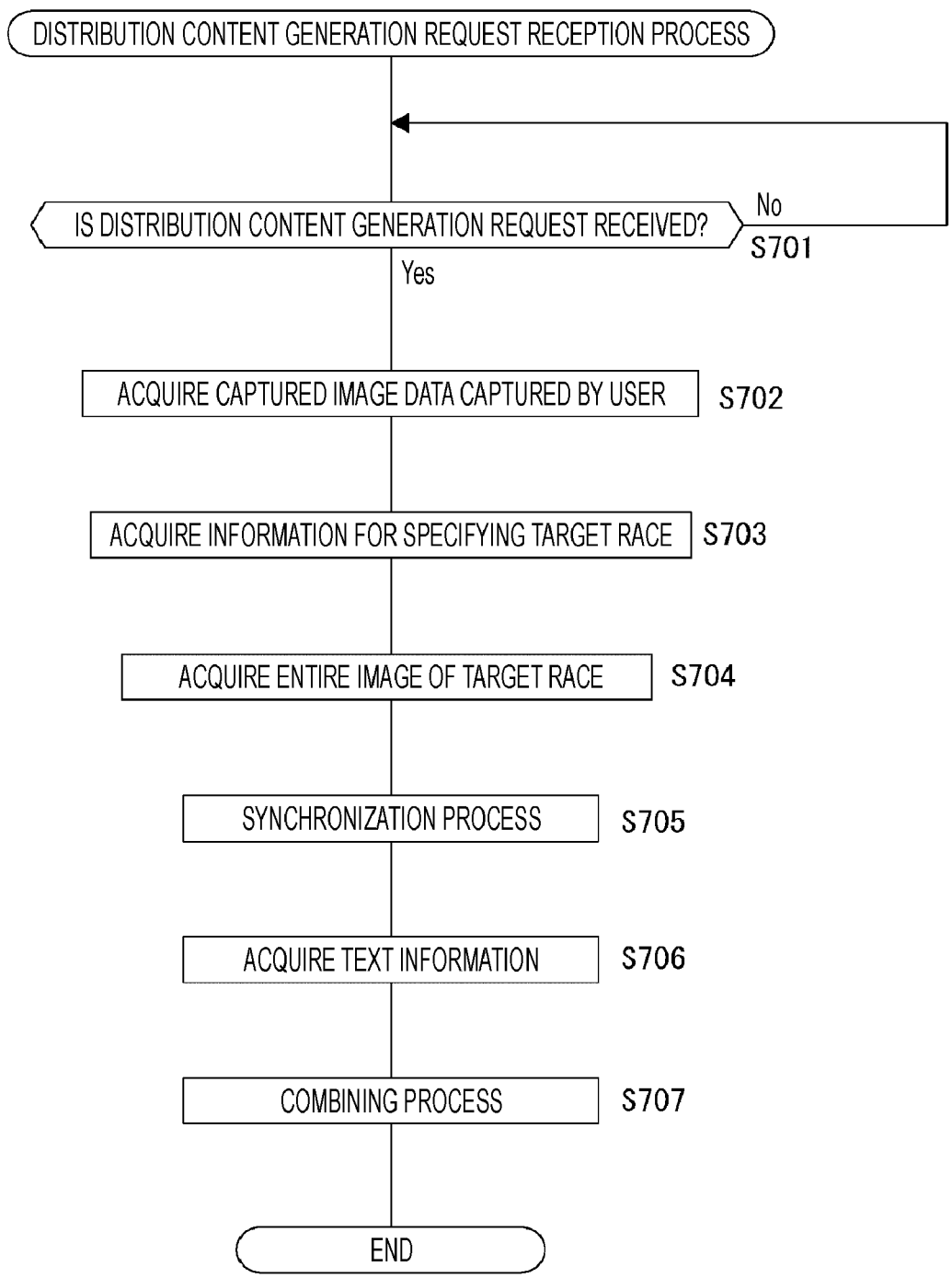
FIG. 13 is a flowchart illustrating an example of a distribution content generation request reception process according to the embodiment.

FIG. 13 illustrates an example of the process executed by the distribution server device 3.

In step S701, the distribution server device 3 determines whether or not a distribution content generation request has been received. This request is to request generation of a distribution content using the captured image data captured by the individual user.

In a case where the request has not been received, the distribution server device 3 executes the process of step S701 again.

On the other hand, in a case where it is determined that such a distribution content generation request has been received, in step S702, the distribution server device 3 acquires the captured image data captured by the user. Therefore, the information processing apparatus such as the personal terminal 5 that has transmitted the request performs a process of uploading the captured image data to the distribution server device 3. Note that the captured image data may be acquired together with the request reception of step S701.

Next, in step S703, the distribution server device 3 acquires information for specifying a target race. This information is transmitted from the personal terminal 5 or the like to the distribution server device 3, for example, when the user performs an operation of selecting the target race. Note that this information may be obtained by analyzing metadata or the like included in the uploaded captured image data instead of being received from the distribution server device 3. Specifically, a target tournament or race may be specified from the imaging date and time or global positioning system (GPS) information.

In step S704, the distribution server device 3 acquires the entire image of the target race. The entire image is captured image data for the target race specified in step S703 among the captured image data acquired from the imaging device 7 installed in the venue, and is, for example, an image obtained by imaging the entire pool.

In step S705, the distribution server device 3 performs a synchronization process. When each piece of captured image data used to generate the distribution content is acquired from the imaging devices 7 set in the venue, it is possible to synchronize the captured image data by matching the time information of the imaging devices 7, for example.

However, in the present example, at least a part of the captured image data is captured by the individual user, and the imaging devices are not synchronized with each other.

Therefore, the synchronization process of step S705 is required.

In the synchronization process, it is conceivable to extract and synchronize timings considered to be the same scene from the characteristic motion or water splash of the subject or the motion of a spectator or a staff or the like arranged on the pool side by performing image analysis on each acquired captured image data.

Alternatively, in a case where audio data is included in each piece of captured image data, the synchronization may be performed by analyzing the audio data.

After performing the synchronization process of each piece of captured image data, in step S706, the distribution server device 3 acquires text information. This process is a process similar to the process of step S104 in FIG. 6.

In step S707, the distribution server device 3 performs a combining process. The combining process is performed on the basis of the processing result of the synchronization process performed in step S705. That is, for example, the combining process is performed such that the captured image data displayed in the first region AR1 and the captured image data displayed in the second region AR2 illustrated in FIG. 4 or 5 are displayed in synchronization with each other.

By executing the series of processing illustrated in FIG. 13, the distribution server device 3 can generate one distribution content in which the captured image data imaged by an individual is synchronized with the captured image data or the like imaged officially.

7. Summary

As described using various examples, the distribution server device 3 includes a content generation unit (content management unit 14) that generates a display content (distribution content) by combining a first image captured by a first imaging device (imaging device 7) and a second image captured by the first imaging device (imaging device 7) or another imaging device (which may be the personal terminal 5 or the like) and having a part of subjects of the first image as a subject.

In the case of imaging a plurality of subjects, there is a demand for simultaneously recording an image for every subject or an image with a changed angle of view, or a demand for browsing.

The image for every subject is, for example, in the case of a swimming image, a zoom-in image or the like of each of a player competing on a first lane and a player competing on an eighth lane.

Furthermore, the image with a changed angle of view is, for example, in the case of a race image, an angle of view obtained by imaging the entire race, an angle of view for imaging only one player participating in the race, and the like.

However, it is difficult for an individual user to leave such a plurality of types of images as recorded images due to imaging environment and a shortage of photographers.

According to each configuration described above, the display content in which an official race image obtained by capturing the entire race and the race image of one player imaged individually are combined is generated, and thus it is not necessary to individually prepare both equipment for imaging the entire race and equipment for imaging a player to be imaged. Furthermore, in a case where an official image is prepared for the image of the player to be imaged, it is not necessary to perform imaging by an individual, and convenience can be improved.

Furthermore, in a case where the official race image obtained by capturing the entire race has a sufficiently high resolution, the zoom-in image of the player to be captured can be generated by cutting out from the entire image. Therefore, it is possible to minimize necessary imaging equipment and contribute to cost reduction.

Furthermore, by combining the entire image and the image of the individual player, it is possible to grasp the characteristics, improvement points, and the like of the individual player, which can be utilized for extracting the coaching information.

The distribution server device 3 may include a transmission processing unit (distribution control unit 19) which transmits the display content.

Therefore, it is possible to transmit, to the user terminal or the like, the display content (for example, the distribution content illustrated in FIG. 4 or 5) obtained by combining the first image and the second image.

As described in the second modification of the editing example of the captured image data, the distribution server device 3 may include the synchronization processing unit 17 that performs the synchronization process of synchronizing the first image and the second image.

Therefore, even when the first image and the second image are captured at different angles of view, it is possible to grasp a temporal relationship.

For example, in the race image and the like, the entire image and the image of the individual player are synchronized, so that the position of the player in the entire race and the like can be easily grasped.

As described in the editing example (FIGS. 4 and 5) of the captured image data, the display content (distribution content) may include superimposition information.

The superimposition information is, for example, character (text) information, image information, or the like.

When the display content is generated by superimposing the character information and the image information on the combination of the first image and the second image, the amount of information included in the display content can be increased, and the content of the content can be understood more deeply.

As described in the editing example of the captured image data (FIG. 5), the superimposition information may be explanatory information regarding the first image or the second image.

For example, in the case of the race image, the explanatory information is a holding date and time, a holding place, a race name, a name of a participant, and the like.

By superimposing and displaying these pieces of information, for example, even when there is a similar display content, it is possible to easily grasp the captured content.

As described in the first modification of the editing example of the captured image data, the superimposition information may be comparison information regarding the subject of the second image.

The comparison information is, for example, information (for example, the image G1) indicating a difference from the target record of the player who is the subject of the second image. Specifically, the comparison information is information indicating how far ahead or behind the target record the subject is.

By superimposing and displaying such information, it is possible to grasp the pace distribution and the like of players that are not known in the venue.

As described in the first modification of the editing example of the captured image data, the comparison information may be information indicating the result of the subject of the second image.

The result of the subject of the second image is, for example, past record of the player oneself of the subject of the second image.

That is, it is possible to compare the past personal-best record with the current record via the image. Furthermore, for example, by superimposing and displaying an image such as a line indicating the record of the personal best, it is possible to visually grasp an excellent portion and an inferior portion during the race, which can be utilized for future training and the like.

As described in the first modification of the editing example of the captured image data, the comparison information may be information indicating the result of a person (for example, a world top swimmer) other than the subject of the second image.

The result of the person other than the subject of the second image is, for example, a record of a player with the best result among other players participating in the same race. Alternatively, the result may be a result or the like such as a Japanese record or a world record.

Therefore, the target result of the player can be compared with the result of this race. In particular, as described above, by performing line display or the like based on the target record, it is possible to visually grasp a weak point or the like of the player.

As described in the coaching information extraction process, there may be provided the analysis processing unit 16 that performs the image analysis for the subject of the second image and extracts a characteristic amount that affects the result of the subject of the second image, and the superimposition information (for example, the text information displayed in the third region AR3) may be information regarding the characteristic amount.

For example, in the case of swimming, the characteristic amount that affects the result of the subject of the second image is the number of times or the frequency of breathing, the number of times of hand scratching, the number of times of breathing, or the like.

By extracting, superimposing, and displaying the characteristic amount that affects the result, the motion of the player can be analyzed more finely, and the coaching information for improving the result can be obtained.

As described in each example such as the distribution content transmission process (FIG. 9), the authentication processing unit 18 that performs user authentication on the basis of the received user information may be provided, and the transmission processing unit (distribution control unit 19) may select and transmit the display content (distribution content) on the basis of an authentication result.

The display content is image content including personal information. Such content is transmitted only in a case where the user authentication is successful.

Therefore, the personal information can be protected.

As described in the distribution content transmission process (FIG. 9), the content management unit 14 that sets the disclosure range for every display content (distribution content) may be provided.

The display content may or may not have a browsing restriction depending on the player of the subject.

Since the disclosure range can be set, content management can be performed in consideration of the intention of the user.

As described in the distribution content transmission process (FIG. 9), the authentication processing unit 18 that performs user authentication on the basis of the received user information may be provided, and the transmission processing unit (distribution control unit 19) may transmit the display content (distribution content) on the basis of the authentication result and the disclosure range.

For example, the user is specified by the user authentication, and it is determined whether or not to accept the request of the user on the basis of the disclosure range set in the display content.

Therefore, it is possible to perform content management according to the intention of the user and appropriately distribute the content.

As described in the second modification (FIG. 13) of the editing example of the captured image data, in the synchronization process performed by the synchronization processing unit 17, image comparison between the first image (for example, the image displayed in the first region AR1) and the second image (for example, the image displayed in the second region AR2) may be performed.

For example, in a case where the first image and the second image are moving images, the synchronization process is performed by partially comparing both images with each other to calculate a matching degree.

Therefore, even when time stamp information is not associated with the images, both images can be synchronized. Furthermore, even when the time stamp information is associated with images, in a case where the images are captured by imaging devices that are not synchronized, it is difficult to synchronize both images from the time stamp information. Even in such a case, according to the present configuration, it is possible to search for matching points by the imaging process and synchronize the matching points.

As described in the live distribution (FIG. 11), the transmission processing unit (distribution control unit 19) may perform streaming distribution.

For example, the streaming distribution is performed by combining an official first image obtained by capturing an entire image in a bird's eye view in a competition and an official second image focusing on a specific player.

Moreover, by making the second image different for every player, different display content for every player is streaming-distributed. Therefore, it is possible to streaming-distribute display content appropriate for every user in a situation where a desired image is different for every user.

As described above, a 5G/local 5G (or local 4G/LTE) line can be used in the live distribution. In this case, it is also possible to use a network slicing technology in which a network is virtualized, network resources are divided (sliced), and slices are properly used according to the use and priority of information to be communicated.

Specifically, for example, the distribution server device 3 distributes, to each terminal to be distributed, various types of data and image data via a base station installed in the venue, constructing a local 5G communication environment in the venue, and controlling communication. In this case, for example, each terminal may perform a process of combining image data or superimposing various types of data on the image data.

At this time, the distribution server device 3 generates information for specifying a slice to be allocated according to the use and characteristics of the data to be distributed, and transmits, to the base station, the data and the information (metadata) for specifying the slice to which the signal is to be allocated in association with each other.

The base station allocates each piece of received data to the slice specified by each piece of metadata, and transmits each piece of data to each terminal to be distributed by using the allocated slice.

Here, as an example of slice allocation, it is conceivable to allocate image data which is preferably viewable without delay to a slice for low-delay transmission. Furthermore, in a case where delay of image data can be allowed, such as a case where visual race watching is mainly performed, for example, it is conceivable to allocate the image data to a slice for large-capacity transmission, and allocate, to a slice for low-delay transmission, various types of information (for example, progress information such as lap time) superimposed on image data which is preferably grasped in a timely manner.

Note that, in the above-described example, the swimming race has been described as an example, but other competitions may be targeted. For example, the target may be a track and field competition such as 100 m running or 110 m hurdle, or may be a group competition such as synchronized swimming. Furthermore, in addition to the competition, the present invention can also be applied to a concert of a wind band, a concert of an orchestral band, and the like.

Specifically, in the case of the group competition, captured image data obtained by imaging all members of the group may be used as an entire image, captured image data obtained by imaging one competitor of the members in a zoom-in mode may be used as a zoom-in image, and the captured image data may be combined to generate a distribution content.

Alternatively, in the case of the concert of the wind band, captured image data obtained by imaging all the players may be used as an entire image, captured image data obtained by imaging one player of the players in a zoom-in mode may be used as a zoom-in image, and the captured image data may be combined to generate a distribution content.

That is, in the performance or competition performed by a plurality of people, the above-described various configurations can be applied.

A program according to the embodiment is a program for causing, for example, a CPU, a DSP, and the like, or a device including the CPU or the DSP to execute each process illustrated in each of FIGS. 6, 7, 8, 9, 10, 11, and 13.

That is, the program according to the embodiment causes the control unit of the distribution server device 3 to execute a generation process of generating display content by combining the first image captured by the first imaging device and the second image captured by the first imaging device or another imaging device and having a part of subjects in the first image as a subject.

With such a program, the distribution server device 3 described above can be realized.

Such a program for realizing the distribution server device 3 can be recorded in advance in an HDD as a recording medium built in a device such as a computer device, a ROM in a microcomputer having a CPU, or the like.

Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as so-called package software.

Furthermore, as well as such a program is installed from a removable recording medium to a personal computer or the like, the program can be downloaded from a download site via a network such as a local area network (LAN) or the Internet.

In addition, such a program is suitable for a wide range of provision of the distribution server device 3 of the embodiment. For example, when the program is downloaded to a portable terminal device such as a smartphone or a tablet, or a device having a camera function such as a mobile phone, a personal computer, a game device, a video device, or a personal digital assistant (PDA), the smartphone or the like can be caused to function as the distribution server device 3 of the present disclosure.

Note that the effects described in the present description are merely examples and are not limited, and other effects may be provided.

8. Present Technology (1)
An information processing apparatus including:
a content generation unit that generates display content by combining a first image captured by a first imaging device and a second image captured by the first imaging device or another imaging device and having a part of subjects in the first image as a subject.

(2)
The information processing apparatus according to (1), further including:
a transmission processing unit that transmits the display content.

(3)
The information processing apparatus according to (1) or (2), further including:
a synchronization processing unit that performs a synchronization process of synchronizing the first image and the second image.

(4)
The information processing apparatus according to any one of (1) to (3),
in which the display content includes superimposition information.

(5)
The information processing apparatus according to (4),
in which the superimposition information is explanatory information on the first image or the second image.

(6)
The information processing apparatus according to (4) or (5),
in which the superimposition information is comparison information for the subject of the second image.

(7)
The information processing apparatus according to (6),
in which the comparison information is information indicating a result of the subject of the second image.

(8)
The information processing apparatus according to (6) or (7),
in which the comparison information is information indicating a result of a person other than the subject of the second image.

(9)
The information processing apparatus according to any one of (4) to (8), further including:
an analysis processing unit that performs image analysis on the subject of the second image and extracts a characteristic amount which affects a result of the subject of the second image,
in which the superimposition information is information regarding the characteristic amount.

(10)
The information processing apparatus according to (2), further including:
an authentication processing unit that performs user authentication on the basis of received user information,
in which the transmission processing unit selects and transmits the display content on the basis of an authentication result.

(11)
The information processing apparatus according to (2), further including:
a content management unit that sets a disclosure range for every display content.

(12)
The information processing apparatus according to (2), further including:
an authentication processing unit that performs user authentication on the basis of received user information,
in which the transmission processing unit transmits the display content on the basis of an authentication result and the disclosure range.

(13)
The information processing apparatus according to (3),
in which, in the synchronization process, image comparison between the first image and the second image is performed.

(14)
The information processing apparatus according to (2), (10), (11), or (12),
in which the transmission processing unit performs streaming distribution.

(15)
An information processing method executed by an information processing apparatus, the method including:
generating display content by combining a first image captured by a first imaging device and a second image captured by the first imaging device or another imaging device and having a part of subjects in the first image as a subject.

(16)
A program for causing an information processing apparatus to execute:
a generation process of generating display content by combining a first image captured by a first imaging device and a second image captured by the first imaging device or another imaging device and having a part of subjects in the first image as a subject.

REFERENCE SIGNS LIST

3 DISTRIBUTION SERVER DEVICE
7 IMAGING DEVICE
14 CONTENT MANAGEMENT UNIT
16 ANALYSIS PROCESSING UNIT
17 SYNCHRONIZATION PROCESSING UNIT
18 AUTHENTICATION PROCESSING UNIT
19 DISTRIBUTION CONTROL UNIT (TRANSMISSION PROCESSING UNIT)

The invention claimed is:
1. An information processing apparatus, comprising:
processing circuitry configured to
obtain a first image of a sporting event captured by an imaging device, the first image having a first subject and a second subject both participating in the sporting event when the first image was captured;
extract a region of the first image containing the first subject, the region not containing the second subject;
enlarge the extracted region to generate a second image;
obtain a third image of an electronic scoreboard displayed during the sporting event;
generate display content by combining the first image, the second image, and superimposition information including comparison information indicating a result of the first subject participating in the sporting event, which is obtained by performing image analysis on the third image of the electronic scoreboard; and
control transmission of the generated display content.

2. The information processing apparatus according to claim 1, wherein the processing circuitry is further configured to perform a synchronization process of synchronizing the first image and the second image.

3. The information processing apparatus according to claim 1, wherein the superimposition information included in the display content generated by the processing circuitry is explanatory information on the first image or the second image.

4. The information processing apparatus according to claim 1, wherein the comparison information includes information indicating a performance result of a person other than the first subject of the second image.

5. The information processing apparatus according to claim 1, wherein the processing circuitry is further configured to
perform image analysis on the first subject of the second image and extract a characteristic amount which affects a result of the first subject of the second image,
wherein the superimposition information includes information regarding the characteristic amount.

6. The information processing apparatus according to claim 1, wherein the processing circuitry is further configured to:
perform user authentication based on received user information, and
control selection and transmission of the display content based on an authentication result.

7. The information processing apparatus according to claim 1, wherein the processing circuitry is further configured to set a disclosure range for the display content.

8. The information processing apparatus according to claim 7, wherein the processing circuitry is further configured to perform user authentication based on received user information, and
control the transmission of the display content based on an authentication result and the disclosure range.

9. The information processing apparatus according to claim 1, wherein, in the synchronization process, the processing circuitry is further configured to perform comparison of image content between the first image and the second image.

10. The information processing apparatus according to claim 1, wherein the processing circuitry is further configured to perform streaming distribution of the display content.

11. An information processing method executed by an information processing apparatus, the method comprising:
obtaining a first image of a sporting event captured by an imaging device, the first image having a first subject and a second subject, both participating in the sporting event when the first image was captured;
extracting a region of the first image containing the first subject, the region not containing the second subject;
enlarging the extracted region to generate a second image;
obtaining a third image of an electronic scoreboard displayed during the sporting event;
generating display content by combining the first image, the second image, and superimposition information including comparison information indicating a result of the first subject participating in the sporting event, which is obtained by performing image analysis on the third image of the electronic scoreboard; and
controlling transmission of the generated display content.

12. A non-transitory computer-readable medium storing a program for causing an information processing apparatus to execute a method, comprising:
obtaining a first image of a sporting event captured by an imaging device, the first image having a first subject and a second subject, both participating in the sporting event when the first image was captured;
extracting a region of the first image containing the first subject, the region not containing the second subject;
enlarging the extracted region to generate a second image;
obtaining a third image of an electronic scoreboard displayed during the sporting event;
generating display content by combining the first image, the second image, and superimposition information including comparison information indicating a result of the first subject participating in the sporting event, which is obtained by performing image analysis on the third image of the electronic scoreboard; and
controlling transmission of the generated display content.

* * * * *